(12) United States Patent
McCourt, Jr.

(10) Patent No.: US 10,719,783 B2
(45) Date of Patent: Jul. 21, 2020

(54) BINARY SIGNAL CLASSIFIERS THAT TOLERATE INCORRECT TRAINING DATA

(71) Applicant: Invoca, Inc., Santa Barbara, CA (US)

(72) Inventor: Michael Kingsley McCourt, Jr., Santa Barbara, CA (US)

(73) Assignee: Invoca, Inc., Santa Barbara, CA (US)

( * ) Notice: Subject to any disclaimer, the term of this patent is extended or adjusted under 35 U.S.C. 154(b) by 0 days.

(21) Appl. No.: 16/414,584

(22) Filed: May 16, 2019

(65) Prior Publication Data

US 2020/0019884 A1 Jan. 16, 2020

Related U.S. Application Data

(60) Provisional application No. 62/698,743, filed on Jul. 16, 2018.

(51) Int. Cl.
*G06N 20/00* (2019.01)
*G06F 17/18* (2006.01)
*G06N 7/00* (2006.01)

(52) U.S. Cl.
CPC .......... *G06N 20/00* (2019.01); *G06F 17/18* (2013.01); *G06N 7/00* (2013.01)

(58) Field of Classification Search
CPC .......... G06N 20/00; G06N 7/005; G06N 5/04; G06N 5/02; G06K 9/6256; G06K 9/6262
See application file for complete search history.

(56) References Cited

U.S. PATENT DOCUMENTS

| | | | |
|---|---|---|---|
| 7,627,622 B2 * | 12/2009 | Conrad | G06F 17/17 708/200 |
| 9,147,169 B2 * | 9/2015 | Jiang | G06K 9/6217 |
| 9,201,556 B2 * | 12/2015 | Free | G06F 3/03545 |
| 2008/0025591 A1 * | 1/2008 | Bhanot | G06K 9/00536 382/132 |

OTHER PUBLICATIONS

Lee, Wee Sun and Bing Liu, "Learning with Positive and Unlabeled Examples Using Weighted Logistic Regression," 2003, Proceedings of the Twentieth International Conference on Machine Learning (ICML-2003), pp. 1-8 (Year: 2003).*

(Continued)

*Primary Examiner* — Eric Nilsson
*Assistant Examiner* — Catherine F Lee
(74) *Attorney, Agent, or Firm* — Hickman Palermo Becker Bingham LLP

(57) ABSTRACT

There are disclosed devices, system and methods for a machine learning binary classifier automatically tolerating training data that is incorrect by determining a correct and an incorrect likelihood ratio that each training data entry has a correctly and an incorrectly labeled output. The correct and an incorrect likelihood ratio are combined with a correct and an incorrect priori odds ratio that the set of training data entries have correctly and incorrect labeled output labels. These two combinations are a correct probability and an incorrect probability that each entry of the set of entries has a correctly and an incorrect labeled output. A logistic regression model if fit to a combination of the correct probability and the incorrect probability for each training data entry to complete the training.

16 Claims, 16 Drawing Sheets
(12 of 16 Drawing Sheet(s) Filed in Color)

(56) References Cited

OTHER PUBLICATIONS

Blum, Avrim and Tom Mitchell, "Combining Labeled and Unlabeled Data with Co-Training," 1998, ACM, COLT '98 Proceedings of the eleventh annual conference on Computational learning theory, pp. 92-100 (Year: 1998).*

Bootkrajang, J. and Kaban, A., "Label-Noise Robust Logistic Regression and Its Applications," 2012, ECML PKDD 2012, Part I, LNCS 7523, pp. 143-158 (Year: 2012).*

Brixius, N., "The Logit and Sigmoid Functions," Sep. 2016, https://web.archive.org/web/20160921083920/https://nathanbrixius.wordpress.com/2016/06/04/functions-i-have-known-logit-and-sigmoid/, 2 pages (Year: 2016).*

Smeraldi et al., "Handling Missing Features with Boosting Algorithms for Protein-Protein Interaction Prediction," Aug. 2010, DILS 2010: Data Integration in the Life Sciences, 17 pages (Year: 2010).*

* cited by examiner

|     | Known Label |     |
| --- | --- | --- |
| Predicted Label | False | True |
| False | TN | FN |
| True | FP | TP |

FIG. 1
100

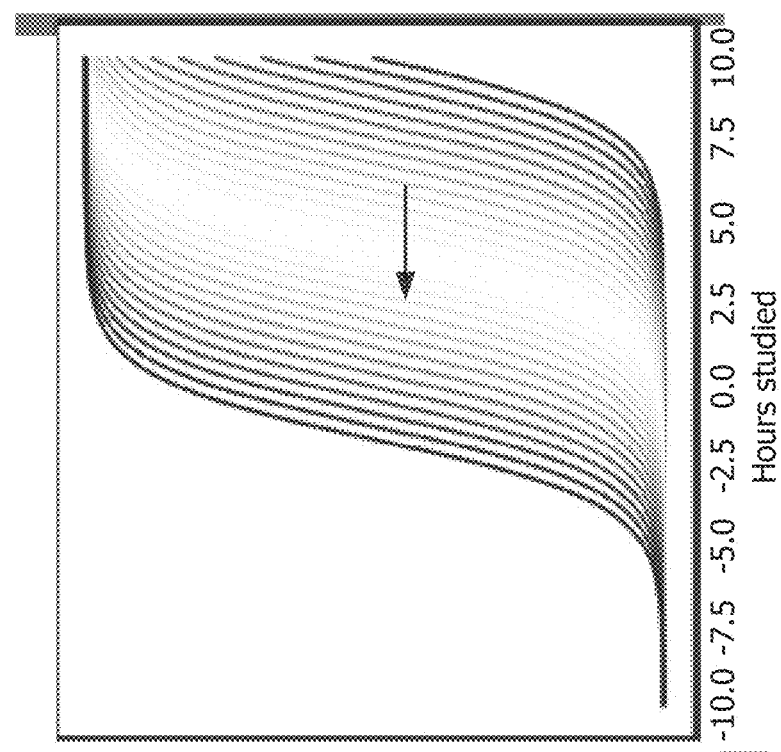
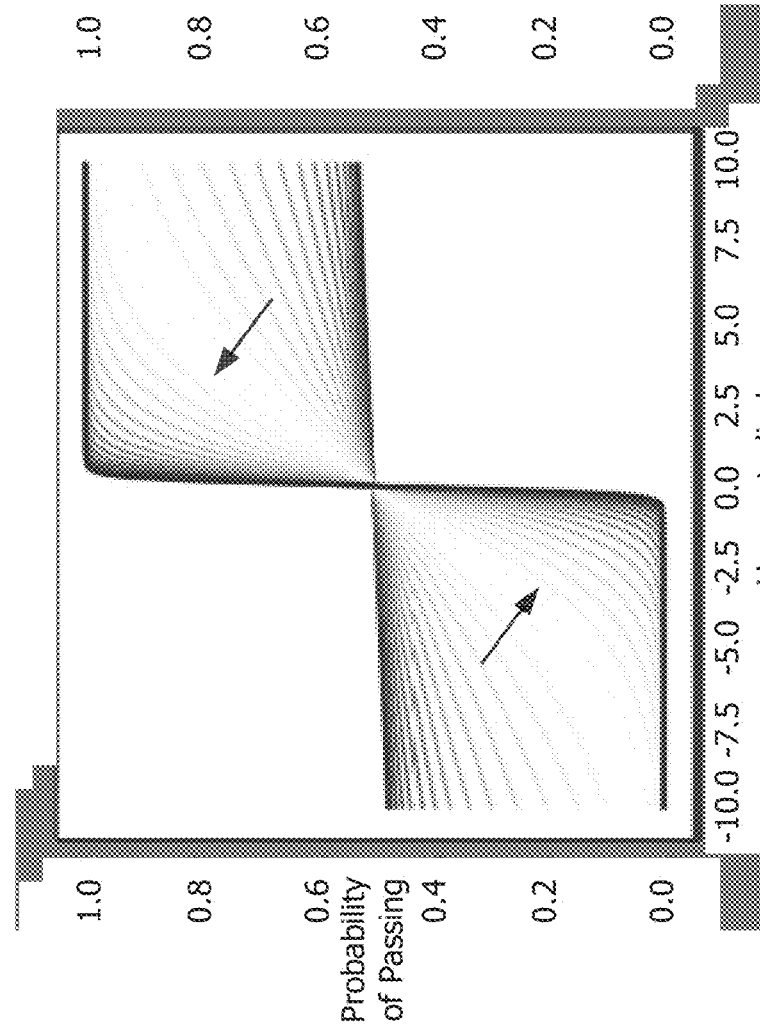
FIG. 3B
FIG. 3A

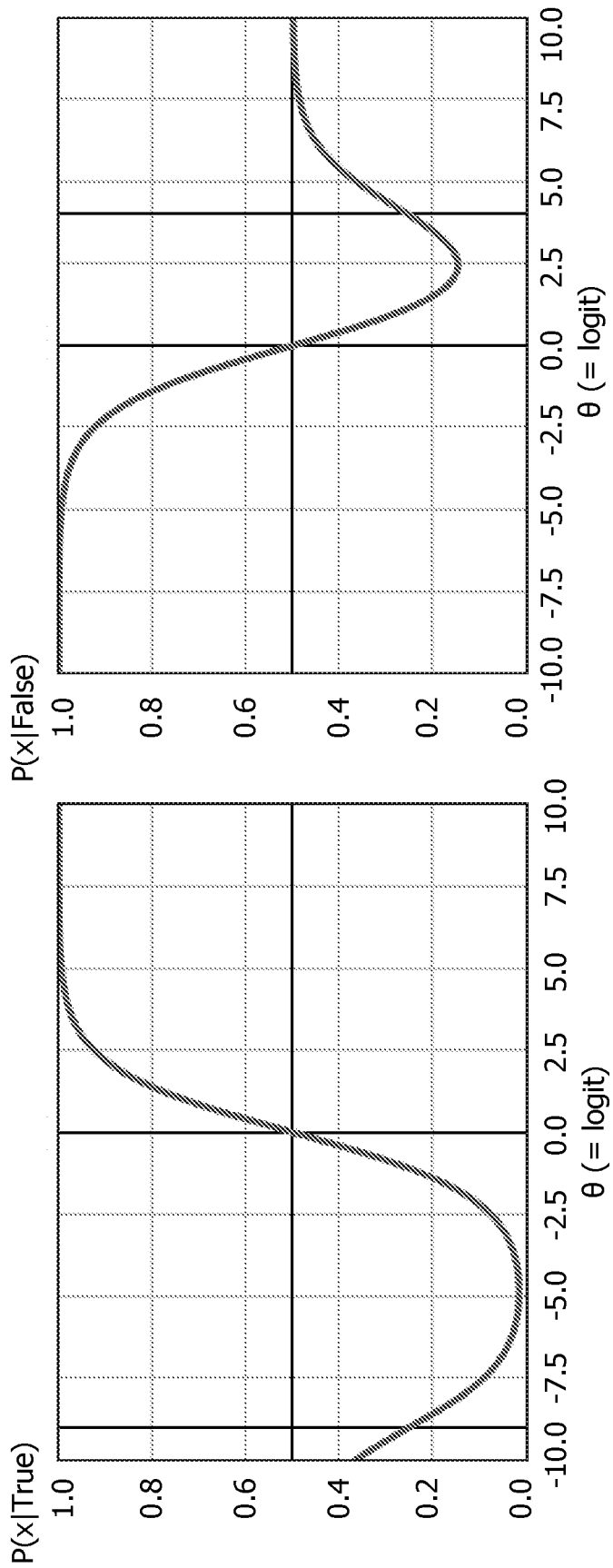

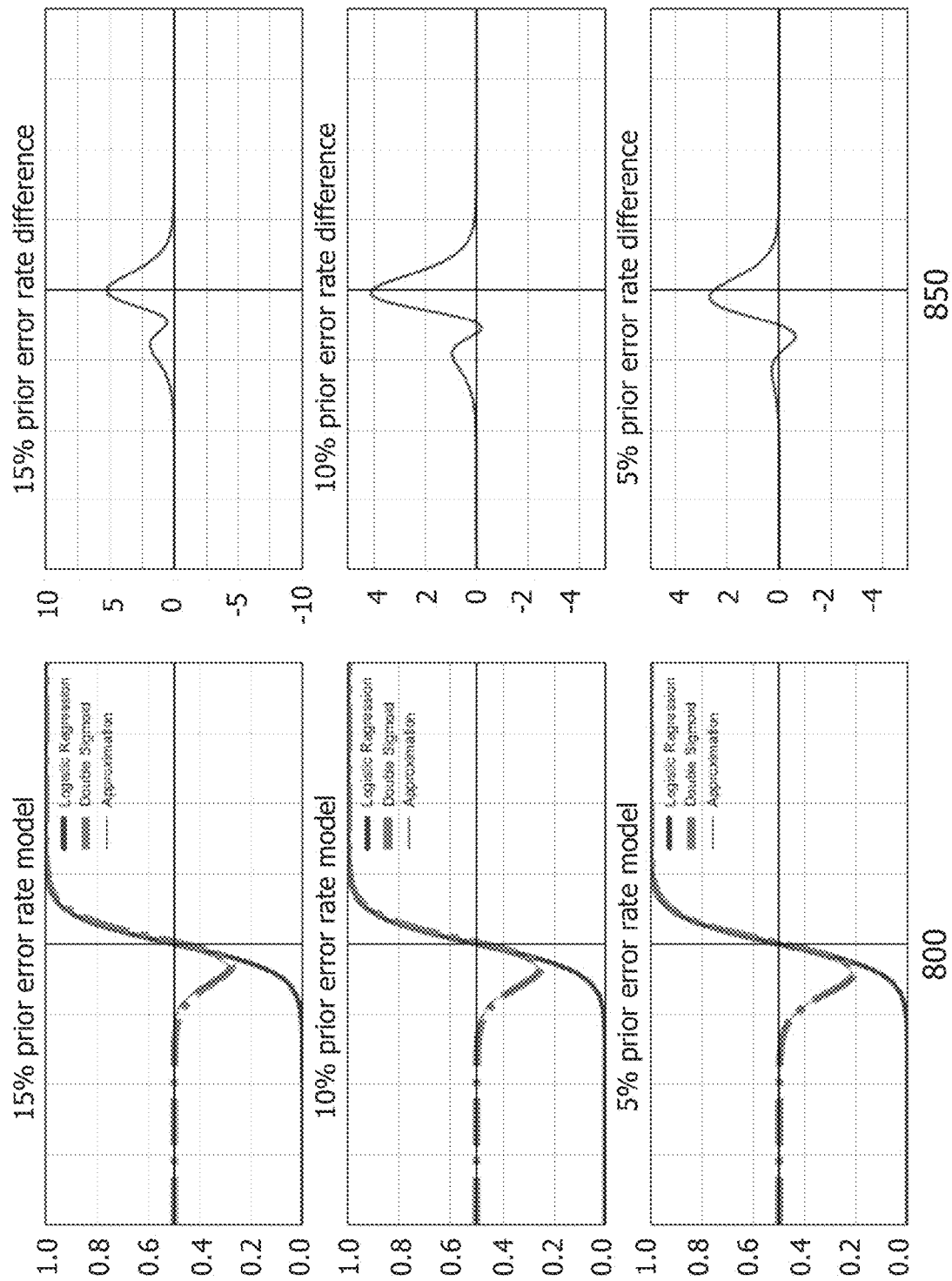

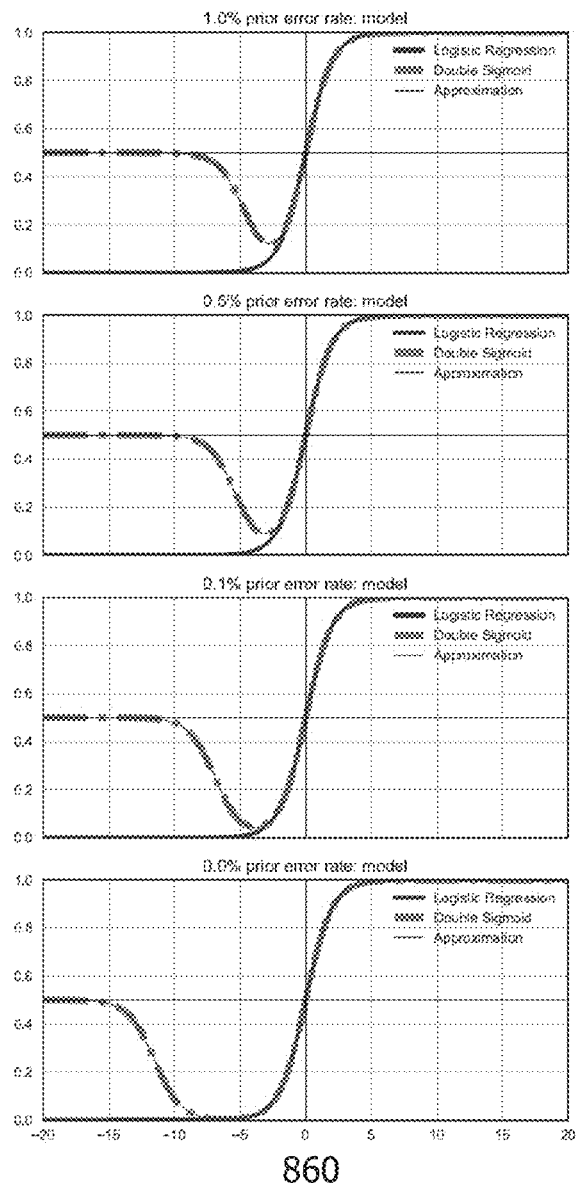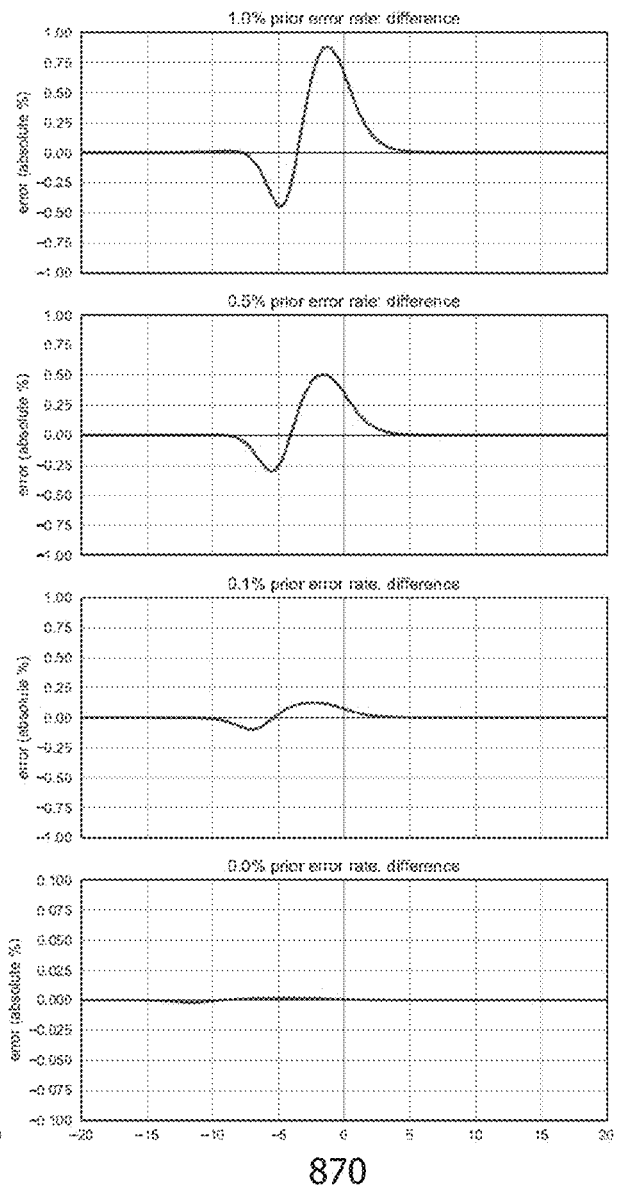
FIG. 8C
FIG. 8D

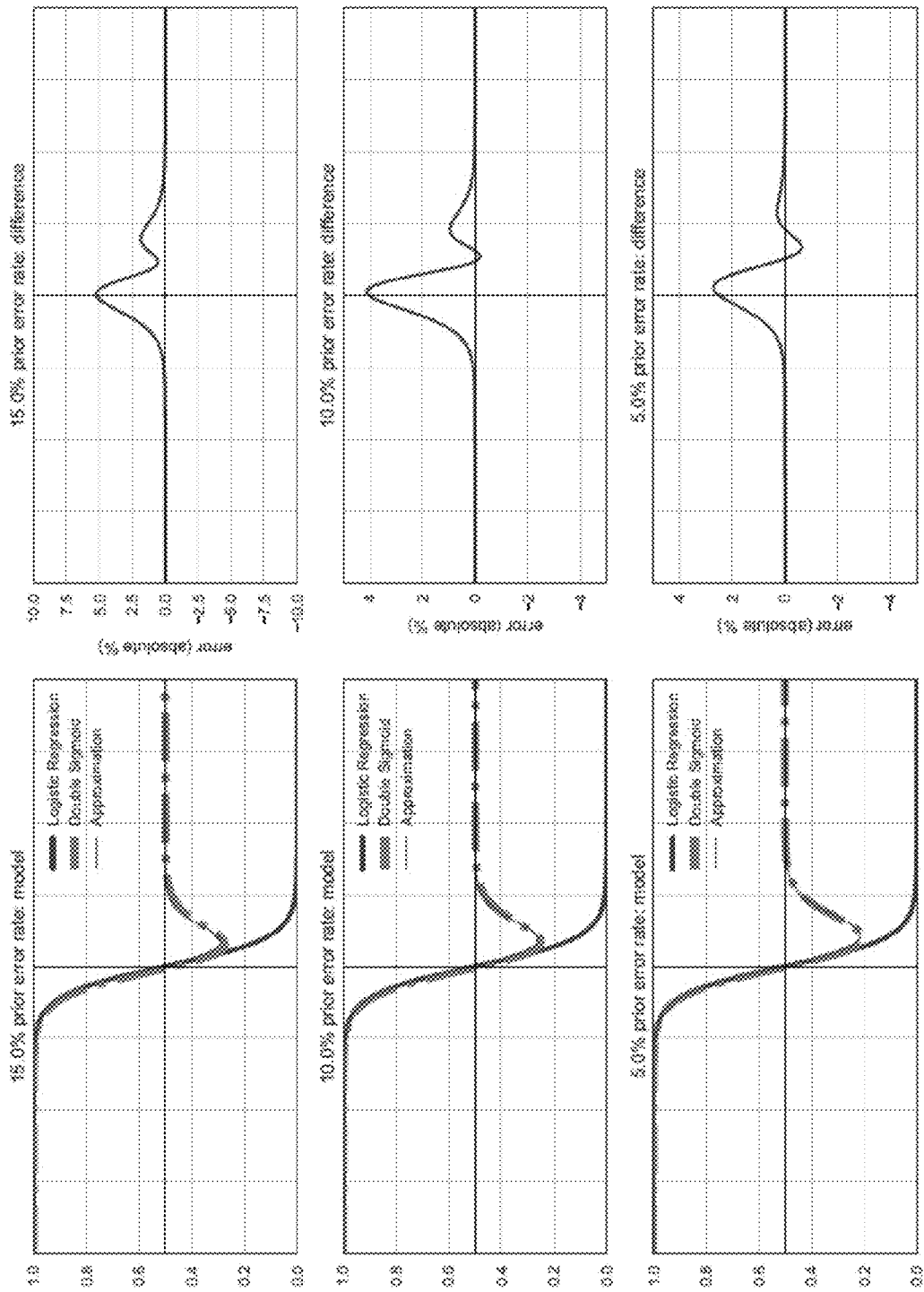

BINARY SIGNAL CLASSIFIERS THAT TOLERATE INCORRECT TRAINING DATA

RELATED APPLICATION INFORMATION

This patent claims priority from provisional patent application 62/698,743, filed Jul. 16, 2018, titled SIGNAL CORRECTION USING DOUBLE SIGMOID APPROXIMATION which is incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to determining whether training data is incorrect for training a binary signal classifier, tolerating such incorrect data and/or removing such incorrect data.

Description of the Related Art

Machine learning is a technical field directed to giving computers the ability to learn without being explicitly programmed. Machine learning evolved from the study of pattern recognition and computational learning theory in artificial intelligence (AI). In many cases, machine learning will use a trained model, such as a trained neural network model or trained mathematical model that is trained to predict an output data based on input data. The model can be trained with training data having known inputs and outputs; and then used to predict outputs of actual input data having unknown outputs. One such model is a machine learning binary classifier which predicts an output as either one of two states, based on one or more inputs.

It can be difficult to determine whether training data for training such a binary signal classifier is correct. For instance, the training data may have a mislabeled or incorrect output for the input data. A single training data entry with a close input data match to the classifier model and a mislabeled output can have a devastating effect on the classifier's training and accuracy. It can cause dozens or thousands of lower matching but correct output training entries to be ignored during the training.

DESCRIPTION OF THE DRAWINGS

The patent or application file contains at least one drawing executed in color. Copies of this patent or patent application publication with color drawing(s) will be provided by the Office upon request and payment of the necessary fee.

FIG. 1 is a representation of predicted labels output by a trained binary signal classifier as compared to actual/known labels for a set of input data.

FIG. 3A is a plot showing how the predicted probabilities according to the logistic regression model of an equation change when b=0, and a increases.

FIG. 3B is a plot showing how the predicted probabilities according to the logistic regression model of an equation change when a=1, and b increases.

FIG. 6 is a plot showing predicted probabilities that a training data output label is correct according to a logistic regression error-tolerant model for a label of true and a choice of the priori odds ratio.

FIG. 7 is a plot showing predicted probabilities that a training data output label is correct according to a logistic regression error-tolerant model for a label of false and the choice of the priori odds ratio of FIG. 6.

FIG. 8A shows plots of the resulting likelihood function on the X-axis for an approximation of a logistic regression double sigmoid model for a label of true and when the priori is 15%, 10% and 5%.

FIG. 8B shows plots of the difference in percentage on the X-axis between the resulting likelihood function of FIG. 8A and a non-approximation logistic regression double sigmoid model.

FIG. 8C shows plots of the resulting likelihood function on the X-axis for an approximation of a logistic regression double sigmoid model for a label of true and when the priori is 1.0%, 0.5%, 0.1% and 0.0%.

FIG. 8D shows plots of the difference in percentage on the X-axis between the resulting likelihood function of FIG. 8C and a non-approximation logistic regression double sigmoid model.

FIG. 9A shows plots of the resulting likelihood function on the X-axis for an approximation of a logistic regression double sigmoid model for a label of false and when the priori is 15%, 10% and 5%.

FIG. 9B shows plots of the difference in percentage on the X-axis between the resulting likelihood function of FIG. 9A and a non-approximation logistic regression double sigmoid model.

Figure 2:
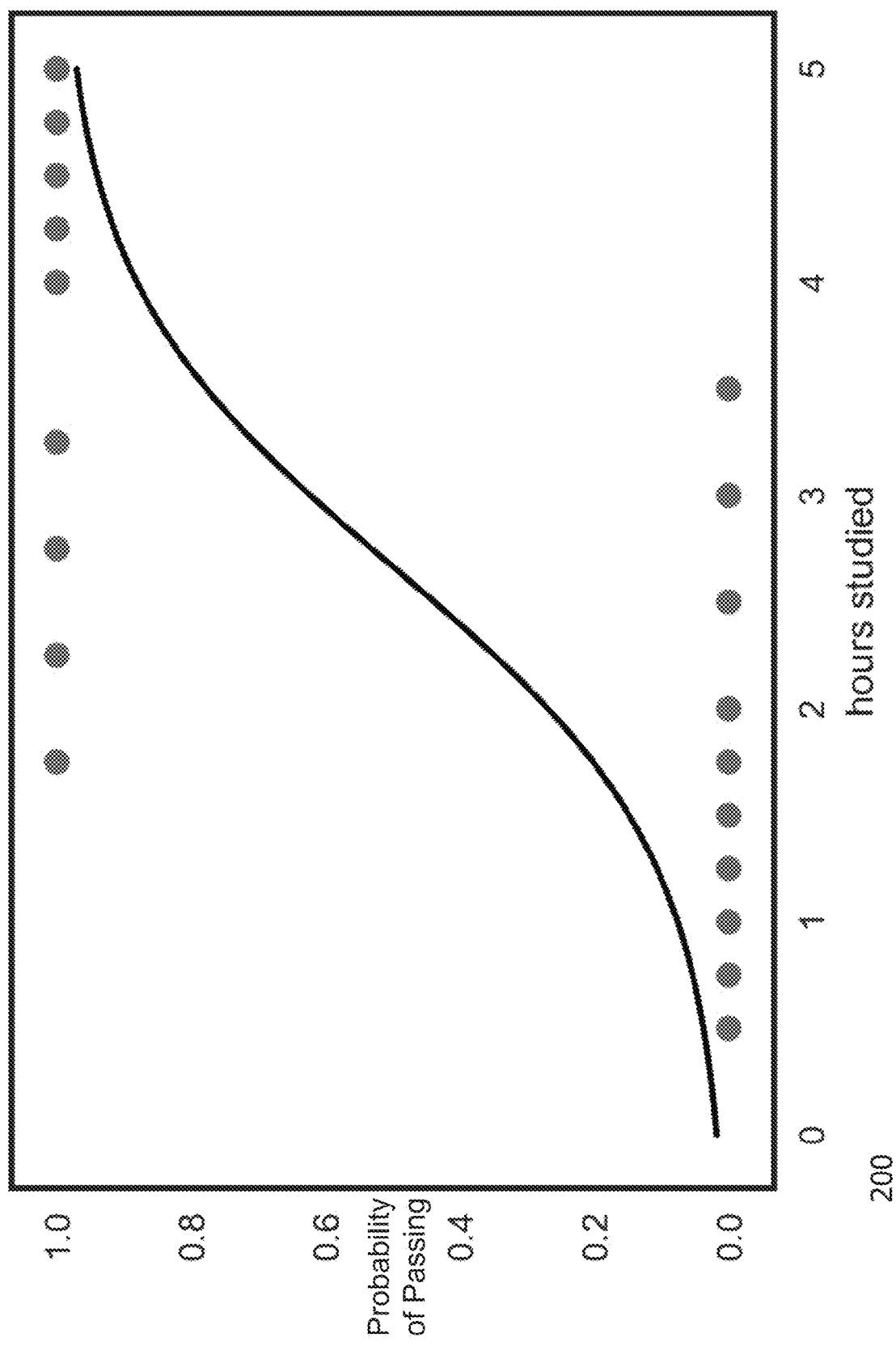
FIG. 2 is a plot showing predicted probabilities according to a logistic regression model that a future student will pass or fail an exam based on how many hours she studies.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

A trained machine learning binary classifier can be used to predict an output as either one of two states, based on one or more inputs. For example, such a classifier can be trained to predict whether a desired signal is or is not present in an input data stream having various signals. The various signals of the input may be a word, a phrase, a sequence of words, a segment of analog or digital audio including one or more people talking, a waveform, or other input signal. The desired signal may be one of only two states, such as 0 or 1; true or false; or an outcome indicated an occurrence or non-occurrence (e.g., the desired signal is a T/F outcome, e.g., "sale"). The input signal may be a sample of words, of analog or digital audio, of a waveform (e.g., an audio segment of one or more people speaking), or other of recordable data such as a telephone conversation. The classifier can be trained with a set of training entries each having known inputs and known outputs. The known outputs can be determined by machine or human review (e.g., machine determination from and/or human observation of) of the input data. Once trained the classifier can be used to predict whether a certain event or output occurs during or in actual input data. That is, the output of the classifier is a prediction of whether a certain signal existed in or was spotted in the actual input data.

A business that sells products (e.g., goods and/or services) over the phone may use such a classifier that is trained to predict whether a sale of a product occurred during a phone conversation with a customer by spotting certain signals or words in the audio signal of the conversation when it is input to the classifier. The classifier is trained with a set of phone call audio signal based inputs and known outputs of whether or not a purchase was made during the call. The trained classifier is then used to predict whether purchases were made during actual customer calls. Here, the input data may be a text or transcribed version of the audio from the telephone calls of the customers and the business is implementing the classifier to predict the purchase or other outputs. It can be appreciated that such models can be used to determine various other output occurrences for various other types of input data.

However, such a prediction may be of little value unless it is accurate. Thus, it is important to use or train a classifier or model that tolerates incorrect training data, such as incorrectly identified outputs (labels or points) for the known inputs. For example, technologies described herein provide a tolerator (e.g., a trained machine learning binary classifier) for tolerating training data that has incorrect output labels when training a binary signal classifier. The tolerator can determine whether training data is incorrect for training, tolerate such incorrect data during training and/or remove such incorrect data from the training data. The tolerator can also be used to clean incorrect training data so that data can be used to more accurately determine an accuracy score or performance score of any binary classifier.

Training data that is incorrect can be automatically tolerated by a tolerator that is or trains a machine learning binary classifier with a set of training data entries that each have known inputs and a known output label, by the tolerator determining a correct likelihood $P(x_i|l_i, \alpha)$ that each training data entry of the set of training data entries has a correctly labeled output label and an incorrect likelihood $P(x_i|\neg l_i, \alpha)$ that each training data entry of the set of training data entries has an incorrectly labeled output label. The tolerator is also input with or identifies a correct priori probability $P(l_i$ is correct) that the set of training data entries have correctly labeled output labels and an incorrect priori probability $P(l_i$ is wrong) that the set of training data entries have incorrectly labeled output labels. The correct and incorrect priori odds may be based on an estimation of the percentage having the correct labels according to the type of data of or source of this set of training data entries; or be based on test results of the percentage of a portion of the set of training data entries that are found to have correct output labels by a person or trained binary classifier. The incorrect priori odds ratio may be the inverse of the correct priori odds ratio. The tolerator can then calculate a correct probability that each entry of the set of entries has a correctly labeled output label using the correct likelihood ratio for that entry and the correct prior odds ratio; and calculate an incorrect probability that each entry of the set of entries has an incorrectly labeled output label using the incorrect likelihood ratio for that entry and the incorrect prior odds ratio. In some cases, these calculations are a multiplication of the likelihood ratio for that entry and the prior odds ratio. In other cases, these calculations are an addition of terms based on correct and incorrect odds ratios. The tolerator completes training of the machine learning binary classifier using a logistic regression model that combines the correct probability and the incorrect probability. The combination may be an addition of the correct probability and the incorrect probability.

FIG. 1 is a representation 100 of predicted labels output by a trained binary signal classifier as compared to known (e.g., actual and/or correct) labels for a set of input data. Representation 100 is a confusion matrix, which succinctly expresses all possible outcomes of a test. Representation 100 can express a trained binary signal classifier's (e.g., the trained model of the classifier) performance against a set of test data.

Representation 100 shows the vertical axis of a table with true (T) and false (F) predicted output labels and the horizontal axis of the table with known true (T) and false (F) output labels for a set of known input data. For example, representation 100 can be show the predicted output labels of either T or F as compared to the known output labels of either T or F of training data for a trained binary signal classifier.

The known output labels may be determined by reviewing (e.g., machine determination from and/or human observation) actual input data of a set of test data entries, and identifying an output label corresponding to each of actual input data. Thus, the set of training data entries may be created by a machine detecting or a person observing the known output labels of the set of training data entries based on observing the known inputs of the set of training data entries. In some cases, a known output may be a predicted output, confirmed output, proven output or otherwise determined binary output that is identified as correct for the input data. In some cases, the training data may be input data which has been reviewed by a person who has identified a known (e.g., a correct or proper) output for that data (e.g., "ground truths"). For instance, an analyst may listen to or read a transcript of audio of a phone call (e.g., input of the training data) to determine whether an event occurred during the call (e.g., if a sale was made) and select a binary output (e.g., output of the training data) for that phone call. Such data with known input and outputs may also be described as training data entries or test data entries for determining an accuracy score and/or a performance score for the trained classifier.

Here, there are four possible outcomes, which we can express in a table as true negative (TN) which indicates the predicted output label is a binary false (e.g., negative, minus or −) and is the same as the known output label which is a binary false; false negative (FN) which indicates the predicted output label is a binary false and is not the same as the known output label which is a binary true (e.g., positive, plus or +); true positive (TP) which indicates the predicted output label is a binary true and is the same as the known output label which is a binary true; and false positive (FP) which indicates the predicted output label is a binary true and is not the same as the known output label which is a binary false.

The trained binary signal classifier may be a binary signal classifier, binary machine classifier or binary classifier model that has been trained with training data to classify one or more input signals as including a signal (a true) or not including (e.g., as excluding) the signal (a false). In some cases, the binary signal classifier is or includes a classification model, such as a logistic regression model, neural network, perceptron, multi-layer perceptron, naïve Bayes/Bayes, decision tree, random forest, deep neural network, etc.

Some binary signal classifiers (e.g., machine learning classifiers) may respond terribly to incorrect training data used to train the classifier that has incorrect known outputs. The incorrect output may be a mislabeled (e.g., inaccurate or flipped) point or output label of the training data such as one that is identified as a binary false and the correct label (e.g., properly or accurate) is a binary true; or one that is identified as a binary true and the correct label is a binary false.

Thus, technologies described herein provide a remedy (or at least way to tolerate or ameliorate) training such classifiers with incorrectly labeled training data. Some of these technologies can be explained using a simple and concrete example of a binary signal classifier that uses logistic regression, such as by having a logistic regression model of the classifier. This analysis applies equally, however, to other classifiers such as neural networks (NN) and the like. That is, the basic principles outline can be extended to work with other types of classifier models such as naive Bayes classifiers, decision trees and random forests.

Logistic regression is a classification model that can be used to predict a categorical or binary outcome (e.g., true/false or cat/dog) as a function of real-valued inputs. In general, however, the model cannot be properly trained to predict binary outcome because binary outcomes are not mathematically differentiable to determine whether updating a parameter of the model (e.g., changing the parameter based on training data) improves the predictions during training. So, there may be no way to calculate how much the model improves when one of the parameters is updated.

For example, if when the model is run on a test data entry it incorrectly predicts an output of "false" for an input (e.g., audio or text of a phone call) and the correct label is known to be "true", one or more parameters of the model can be updated to make the model more accurate. For instance, after running the model on the test data entry, one or more of the parameters of the model are updated (e.g., changed) to improve the model's accuracy, and the model is re-run on the same test data entry, and the output for the updated modes is compared the test data known output. But with a small change in the model parameters, the model may be very likely to still predict "false" and there is no clear way to know whether this second "false" is a more or less correct prediction than the first "false" because they are the same output label. So, this update of the parameters does not help determine in which direction to nudge those parameters in order to improve the model because it cannot determine if the update made the prediction more or less correct.

In order to have something differentiable, rather than predicting the outcome, the probability of the outcome can instead be predicted. For example, a probability of the outcome prediction can be made that "there's a 79% chance that a sale happened on this phone call" which predicts a probability of 79% that the output for a sale was true for the input of the phone call's audio of text. If desired, we can then turn this probability of the outcome prediction into a categorical prediction by thresholding this probability at 50% for example; and saying any time this prediction is greater than 50% we will detect that a sale output was spotted in or for the input data. In addition, this probability information can be more useful (e.g., in practice) by considering that a prediction with probability P~96% is more likely to be true than one with P~52%. Note that these probabilities may not necessarily be taken literally. That is, predictions with P~96% may not in fact be correct 96% of the time. However, if enough training data exists, and if reliable estimates of our confidence in the probability of the outcome prediction are important, a probabilities of the outcome prediction can be calibrated.

The following example of using a logistic regression model to attempt to predict whether a student will pass an exam, based on how many hours the student studies for it, can be used to further illustrate the technologies herein. For instance, for a group of 20 students who each spend between 0 and 6 hours studying for an exam, how does the number of hours spent studying affect the probability that the student will pass the exam? The hours the students studied are 0.5, 0.75, 1.00, 1.25, 1.50, 1.75, 1.75, 2.00, 2.25, 2.50, 2.75, 3.00, 3.25, 3.50, 4.00, 4.25, 4.50, 4.75, 5.00 and 5.50. The pass fail results are (1=passed; 0=failed): 0, 0, 0, 0, 0, 0, 1, 0, 1, 0, 1, 0, 1, 0, 1, 1, 1, 1, 1, 1, respectively. The hours and results may be considered training data for a binary classifier, such as one using a logistic regression model.

For example, based on this data, we can use a logistic regression model to predict the probability (e.g., a probability of the outcome prediction) that a future student will pass or fail the exam (e.g., output of the model), based on how many hours she studies (e.g., input to the model). More particularly, some sort of mathematical theory for how studying influences success can be used to calculate a probability P of passing the test, based on the number of hours H studied. Alternatively, logistic regression can be used by instead assuming that the probability P follows the distribution of the data of the following logistic regression model of equation (A):

$$P(\text{pass}) = [1 + \exp(-[aH+b])]^{-1} \quad (A)$$

where "H" is the number of hours the student studies; and "a" and "b" are two numbers which are yet to be determine by fitting the data to this logistic regression model. In some cases, such a model is described as a Sigmoid function. This model is an assumption, and it will almost always be wrong in detail. Probabilities are under no obligation to follow this equation just because it is being used. How large the differences are between this model and the data will vary on a case-by-case basis, and as a result a logistic regression model may not always work to model every set of data. It is also important to understand that this assumption of the data fitting this sigmoid model is the characteristic step of logistic regression. This characteristic step is different than those for neural network-based models, Bayesian classifiers, or any other type of model, and in some sense, it is this step that defines the logistic regression model. Different uses may therefore require different models, but our methodology applies to any model which makes probabilistic predictions.

In this case, the probabilities P can be represented as a number between 0 and 1, rather than as percentage points. A probability of 1 corresponds to 100% certainty, 0.5 to 50%, 0 for 0% and so on. For example, this probability P is shown by FIG. 2 which is a plot 200 showing predicted probabilities P according to a logistic regression model, that a future student will pass or fail the exam, based on how many hours she studies. The plot 200 plots the predicted probabilities of passing (e.g., a probability of the outcome prediction of the model) against an X-axis of the probability of passing (one of the binary outputs of the model) and a Y-axis of the hours studied (the input to the model). The plot shows a logistic regression curve of the probability P fitted to the data.

To arrive at P in FIG. 2, and thus train the classifier or model, the parameters a and b are selected that maximize the probability that the model is correct, given the data of the 20 students. This selection is difficult to do, because it involves trial and error. So, instead, it is assumed that the model is true and then the likelihood is calculated for obtaining the data of the 20 students, in some alternate universe where the model is known to be correct. A model is scored by the probability, or likelihood, that it assigns to the training data set. The model parameters a and b are then selected that maximize this likelihood. This process of assuming that the model is true and then the calculating likelihood may appear as a backwards way to determine the model's parameters (e.g., a and b to train the model of equation (A)), but it is common practice. This process may or may not provide a usable trained model, on a case-by-case basis.

Notably, assuming that the model is true, we can select or calculate the parameters a and b which maximize the likelihood function l of equation (1):

$$\ell = \left( \prod_{i \text{ s.t. } l_i = \text{True}} P(\vec{x}_i) \right) \times \left( \prod_{j \text{ s.t. } l_j = \text{False}} [1 - P(\vec{x}_j)] \right) \quad (1)$$

where $\vec{x}_i$ represents the ith data point (ditto for j), $\prod$ represents the product symbol, s.t represents "such that", li represents the ith ground truth label (and lj represents the jth ground truth label) and P(x) represents the probability that point x is true, according to the model. How P(x) is determined depends on the model; in the example discussed above, for example, P(x) is determined using the model of equation (A). Equation (1) assigns a "likelihood" score to the model used to compute P. For clarity, in equation 1 we use the index i to run over all 'True' examples, and the index j to run over all 'False' examples. This makes clear that the data points entering into each of the two terms are distinct. In what follows, the word probability and the symbol P are used to express an amount of certainty about any random process. Though, for this particular scenario, where some model is assumed to be true and the probability that the data is consistent with the model is calculated, we are using the word likelihood and the symbol l.

The parameters a and b respectively define the sharpness and location of the transition from the output of False (or fail) to True (or pass). The effect of varying these parameters can be seen in FIGS. 3A-B. For example, FIG. 3A is a plot 300 showing how the predicted probabilities P according to the logistic regression model of equation (A) change when b=0, and a increases in the direction of the arrow. The plot 300 plots the predicted probabilities of passing against an X-axis of the probability of passing and a Y-axis of the hours studied similar to that of FIG. 2, except for b=0, and for multiple values of a.

Also, FIG. 3B is a plot 350 showing how the predicted probabilities P according to the logistic regression model of equation (A) change when a=1, and b increases in the direction of the arrow. The plot 350 plots the predicted probabilities of passing against an X-axis of the probability of passing and a Y-axis of the hours studied similar to that of FIG. 2, except for a=1, and for multiple values of b. Standard numerical techniques can be used to find the parameters which maximize this likelihood.

However, the likelihood is optimized, the problem can arise that the likelihood is very close to zero for almost every choice of parameters a and b. Thus, it can be difficult to accurately determine the "uphill" direction or direction for increasing a and b when the likelihood is very close to zero and may not make a meaningful change. So, for practical reasons, it may be more determinative to try to maximize the logarithm of the likelihood of equation (1) using equation (2):

$$\log \ell = \sum_{i=1}^{N} [l_i \log P(\vec{x}_i) + (1 - l_i) \log[1 - P(\vec{x}_i)]] \quad (2)$$

where $\vec{x}_i$ represents the ith data point, $\Sigma$ represents the summation symbol, li represents the ground truth label assigned to point i, and P represents the probability that point xi is true, according to the model (e.g., using equation (A)), For convenience, equation (2) uses the definitions of 'True'=1 and 'False'=0 so that the two terms in equation (1) can be written as a single sum in equation 2. Here, equation (2) adds the probabilities for True and False points into a single equation. For example, taking the log of equation (1) to create equation (2) replaces the product with a sum, and P with log(P). There are two sums in equation (2) from the two product symbols: one over all the True points, and one over all the False points. Equation (2) multiplies the $1^{st}$ term by y: and y is 1 for all the true points (so it does not modify them at all) and 0 for all the false points (so including them in the sum has no effect). Similarly, equation (2) multiplies the second term by (1−y), which is 1 when y is False (thus having no effect) and 0 when y is True (so that including these terms has no effect on the model). This allows equation (2) to combine the two sums in a simple form.

Figure 4:
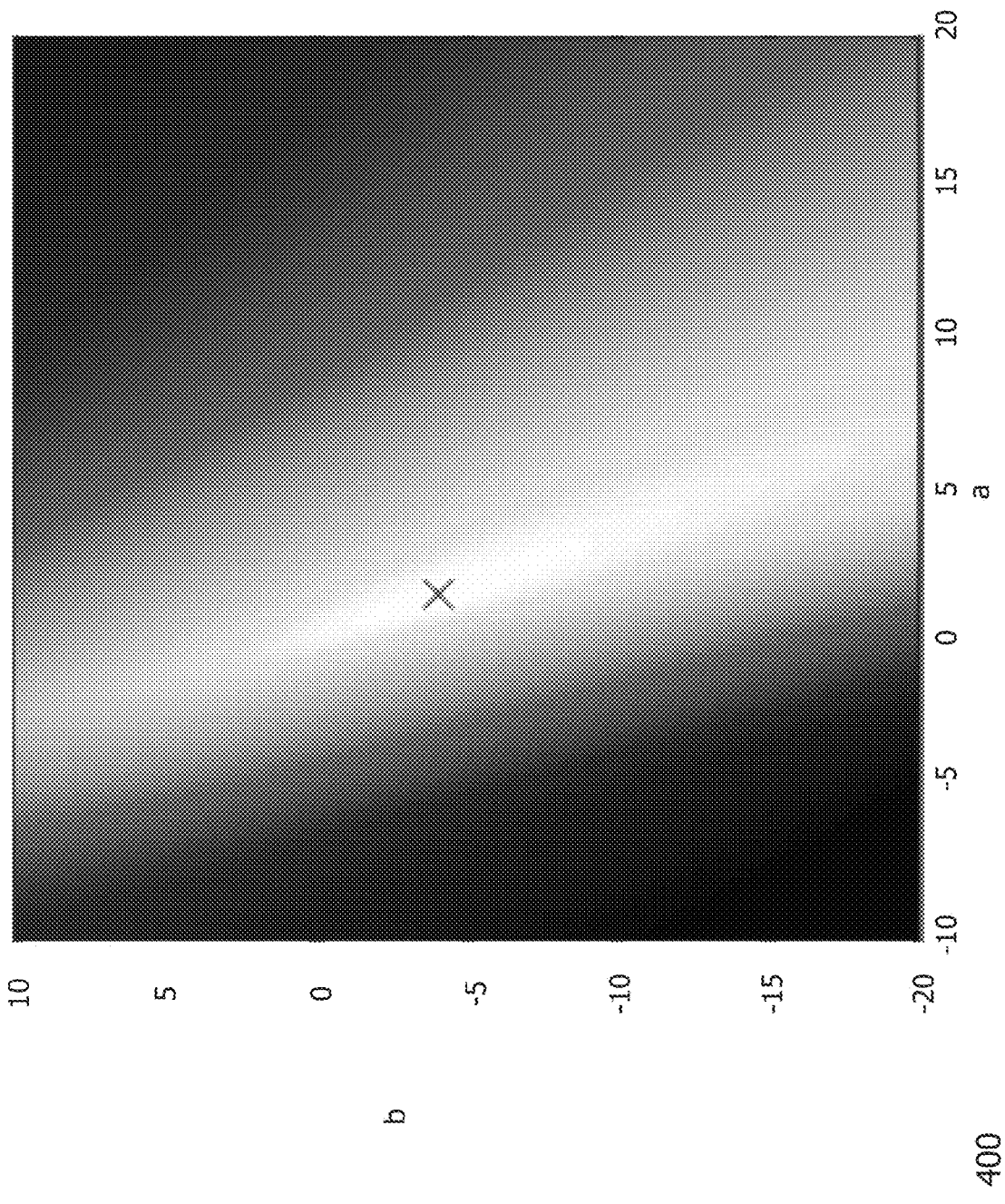
FIG. 4 is a plot showing the values of the parameters that maximize a log-like function of a likelihood function that is based on predicted probabilities according to a logistic regression model.

For the student data shown above, the log-likelihood function of equation (2) can be plotted as a function of its parameters a and b. For example, FIG. 4 is a plot 400 showing the values of the log-likelihood function based on predicted probabilities P according to a logistic regression model. The blue 'X' in FIG. 4 plots parameters a and b that maximize the equation (2), which are the parameter that best match the data of the 20 students to the logistic regression mode of equation (A). The plot 400 plots the parameters a and b with higher likelihoods as the lightest shaded areas against an X-axis of the parameter a and a Y-axis of the parameter b.

The plot 400 shows a long white strip of high probability, indicating a large number of different choices of a and b would work virtually equally as well as the best-fit solution marked with the blue 'X'. This means there is uncertainty in the best possible selections of the parameters a and b. It also means that the best possible selections of a and b may be arbitrary; and that the resulting best model parameters could shift around dramatically due to small changes in the training data, among other things. This may be a problem because it makes it difficult to explain why a certain a and b are selected.

In order to avoid this arbitrariness, a preference can be added for simple models. This helps avoid over-fitting the data to the model, and it makes the model parameters selected easier to explain and to justify. It also makes the probability distribution or plot of FIG. 4 look more like a bullseye, which is easier for an optimizer (being used to train the model) to calculate the selection for a and b that maximizes equation (2).

The regularization process and strength are called hyperparameters because they can be chosen arbitrarily, and they cannot be inferred directly from the data like the parameters described above. These hyperparameters can be selected using cross-validation experiments. To perform cross-validation, a fraction of the training data is withheld to create a validation set. The model is trained repeatedly with different values for the hyperparameters. Each version is tested against the validation set, and the best-performing model is selected.

Comparatively, the non-log (e.g., equation (1)) version of FIG. 4 would look almost entirely black, with a small white dot around the point of maximum likelihood. This makes it very hard to find the best solution, since information about incremental improvements is effectively lost (e.g., there is only "right" and "wrong") so it is difficult to determine whether changes in a and be improve the model.

Prior descriptions relate to what logistic regression is, how it works, and how a model's parameters can be estimated to fit training data to the model. The process of estimating the model parameters is sometimes called fitting (in the natural sciences) or training in machine learning.

It is noted that while the prior description focuses on logistic regression, it also applies equally well to neural networks. Logistic regression can assume the probability P that a point (e.g., a training data entry) with data $\vec{x}$ (e.g., a known output label) is True (e.g., as opposed to False) follows a sigmoid function of equation (3):

$$P(\text{point is True}) = \frac{1}{1+\exp(-\theta)} \quad (3)$$

where $\theta = \vec{a} \cdot \vec{x} + b$, where $\vec{a}$ and b are the model parameters to be estimated to fit the data (e.g., training data input and output) to the model. In other words, a set of training entries each having input data and a known output of True can be used to train the model of equation (3) by adjusting $\vec{a}$ and b until or so that the probability P is closest to 1 for each training data entry. This is fitting the training data to the model or training the model. In some cases, equation (3) a version or repeat of equation (A).

The parameter $\theta$ is sometimes called the logit or the log-odds because algebra can be used to show the logit as equation (4):

$$\theta = \log\left[\frac{P(\text{point is True})}{P(\text{point is False})}\right] \quad (4)$$

where $\theta = \vec{a} \cdot \vec{x} + b$, P (point is True) is the probability that a point with data $\vec{x}$ is True as predicted by the model, and P (point is False) the probability that a point with data $\vec{x}$ is False as predicted by the model. For example, if for some training data known output point $\theta=3$, then according to the model of equation (3) there are 20:1 odds that the point is True (e.g., the point matches the model), or a 95% probability that the point is True.

As noted, to build a logic regression model, these probabilities can be used to compute a likelihood function and the model parameters can be estimated by maximizing the likelihood. Comparatively, to create a neural network, all that changes from the descriptions regarding a logic regression model, is how the logit $\theta$ is calculated. The description for a neural network does not even change it all that much from that for a logic regression model. For example, the following are the functions defining three different types of models and showing how the descriptions regarding a logic regression model apply to these models:

For logistic regression: $\theta_{LR} = \vec{a} \cdot \vec{x} + b$. Thus, mathematically, this $\theta_{LR}$ behaves and looks just like the equation for a line. So logistic regression can be described as a linear model.

For multilayer perceptron neural network (MPNN): $\theta_{MLP} = a_n f(a_{n-1} f( \ldots f(\theta_{LR}) \ldots ) + b_{n-1}) + b_n$, where $f$ is called the activation function (see below). This is mathematically similar to logistic regression, but with the nonlinear activation function f applied repeatedly. This allows the model to fit more complex datasets, such as ones where the boundary separating different classes is curved rather than straight (we provide an example of such a dataset in FIG. 13).

Everything else described regarding a logic regression model, from calculating probabilities to calculating likelihoods to estimating parameters, is identical for these three classes of models: most importantly, equations (2) and (3) defining the likelihood are unchanged . . . neural networks function by defining a more complicated computation of the intermediate parameter theta.

A fundamental assumption underlying all of these different models is that the probability falls exponentially with the logit function $\theta$. For example, the probability P of the data matching the model is proportional to $e^x$ or exp(x) where x is $\theta$.

Thus, mislabeled or incorrect training data (e.g., such as training data having an incorrect output label or point) can have a punishing effect on the training of a binary signal classifier or model due to this exponential function. Such data can push the trained model away from being or becoming a true model (e.g., after training the model will output the known training outputs in response to receiving the training inputs). For example, the odds ratio of the probability of the data matching the model scales with the logit function θ as follows:

| log odds θ | odds |
|---|---|
| 0.0 | 1 to 1 |
| 0.1 | 1.1 to 1 |
| 0.5 | 1.6 to 1 |
| 1 | 2.7 to 1 |
| 2 | 7 to 1 |
| 3 | 20 to 1 |
| 4 | 55 to 1 |
| 5 | 150 to 1 |
| 10 | 22,000 to 1 |
| 15 | 3.3 million to 1 |
| 20 | 480 million to 1 |
| 25 | 7.1 billion to 1 |

For instance, a training data entry that is incorrect or has a mislabeled point is labeled False, but is actually True (the correct label), and for a correctly trained model, this point has a modest logit function of θ=5. This logit function corresponds to 150:1 odds against this prediction, which will cause a punishing penalty against the likelihood function being accurate when this incorrect training data is used to train the model. For example, an optimizer being used to train the model, not knowing that this point is mislabeled, will happily throw away dozens of correct training data points, in order to force this incorrect training data point to fit the model because of the 150:1 odds against this point. This is going to distort the trained model away from being a true model; and possibly cause it to misfunction or output useless results.

In a worse case, the incorrect point would have θ~10 in a correct model, causing the optimizer to throw out thousands of good points in order to fit this bad one. This could be enough to destroy a model entirely with just a single mislabeled point.

Thus, logistic regression can be very sensitive to mislabeled known output data points, with even a single bad point possibly causing a huge swing in the fit of the model to the data. This sensitivity to mislabeled points is not unique to logistic regression and applies to binary classifiers that use other types of models. For instance, incorrect training data causing a huge swing in the fit of the data is a statement about the probabilistic interpretation of the model, and as a result it applies nearly equally to other types of models. Thus, incorrect training data causing a huge swing in the fit of the data to the model is a very general problem for a wide class of machine-learning models. The good news that there is a solution.

For example, a new algorithm or model can be used that explicitly tolerates mislabeled training data or ground truth points. As noted, in order to train a logistic regression model, the likelihood of training data points (inputs and outputs) matching or mapping to the model l (α) can be calculated as equation (5):

$$\ell(\alpha) = \prod_i Q(x_i \mid l_i, \alpha), \qquad (5)$$

where Q (xi|li) is shorthand notation for the probability the point xi is predicted as matching the known training data output li (e.g., an assigned ground truth label), Π indicates that these probabilities are multiplied for all i training entries, and α represents all of the parameters in the model. In the case of logistic regression, or of a neural network, the training data is presumed to be perfect, so the ground truth labels li are exactly equal to either 0 or 1. In this case, Q(xi|li, alpha)=li P(xi|alpha)+(1−li)[1−P(xi|alpha)] and equation (5) reduces to equation (2) above. In what follows, a more sophisticated form for Q(xi|li, alpha) is derived which allows for uncertainty in the ground truth labels. In logistic regression and in neural network models, the predicted probability P that a point is true can be given by equation (6):

$$P(x_i) = [1 + \exp[-(\vec{x}_i \cdot \vec{\alpha} + b)]]^{-1} \qquad (6)$$

note that this equation is similar to equation (A) used above (e.g., P (pass)=[1+exp(−[aH+b])]−1) where P ($x_i$) is "P (pass)" the probability of a future student passing, $\vec{x}_i$ is "a" the first parameter for the model, $\vec{\alpha}$ is H the hours studied, and b is "b" the second parameter for the model. In some cases, equation (6) is related to or similar to equation (A); where equation A assumes there is only one relevant variable (the # of hours studied), but equation (6) assumes there can be many relevant variables (alpha is just a list of all of them).

This equation (6) can be more complicated in other types of binary classifier models, but the basic idea is almost always the same. As noted, this form for the probability has some serious problems, such as that it is highly intolerant of incorrect or mislabeled training points. It can predict an exceedingly low probability for them not matching and that can really swing the training of the model. One way to address this problem is to correct the equation (5) to include the possibility that any given output training point or entry (e.g., such as a ground truth label) is incorrect. Thus, equation (5) can be referred to as a "vanilla" logistic regression model having a single sigmoid function, and a more complicated error-tolerant logistic regression model can be used that is more tolerant of and less susceptible to incorrect or mislabeled training points.

For example, in order to train a binary classifier model, the likelihood of training data points (inputs and outputs) matching or mapping to the model l (α) can be calculated using a model having or that is equation (7):

$$\ell(\alpha) = \prod_i [Q(x_i \mid l_i, \alpha) \times P(l_i \text{ is correct}) + Q(x_i \mid \neg l_i, \alpha) \times P(l_i \text{ is wrong})] \qquad (7)$$

where xi represents the ith data point, α represents the parameters in the model, li represents the ground truths (e.g., training data known output), Q (xi|li, α) is shorthand notation for the probability the point xi is predicted as matching the assigned ground truth label li (e.g., the label $l_i$ is correct) using equation (6), P ($l_i$ is correct) is the probability that the label li is the correct label, Q (xi|¬li, α) is shorthand notation for the probability the point xi is predicted as not matching the assigned ground truth label li (e.g., the label $l_i$ is in correct and the opposite label represented by ¬$l_i$ is the correct label) using equation (6), P ($l_i$ is wrong) is the probability that the label li is the incorrect label (e.g., the wrong label, flipped label, mislabeled or opposite label).

Equation (7) is now a more sophisticated form of equation (2), and allows for the possibility of incorrect ground truth labels. If in equation (7) it is assumed the data is perfect; i.e., P(li is correct)=1 and P(li is wrong)=0, then we recover equation (2) precisely from equation (7). But we such a strong assumption does not need to be make about the data.

Equation (7) may be an error-tolerant model that calculates the probability that each point in the training dataset is mislabeled using Q ($x_i$|¬$l_i$, α), and then weights each point in the loss function according to this uncertainty using P ($l_i$ is wrong). This process of equation (7) considers alternative possibilities or is marginalizing the model over alternative possibilities of the label being incorrect. By considering alternative possibilities equation (7) overcomes or minimizes the above noted failures for machine learning models or binary signal classifiers that train using training data that is incorrect. Equation (7) can be used to determine the probability that any given output label of a training data entry is incorrect by using a logistic regression likelihood function within the context of this model for whether any given label is incorrect Q (xi|¬li, α). For example, for equation (7) calculating Q (xi|li, α) can be performed as shown above for the prior vanilla logistic regression of equations (1)-(5). Similarly, calculating Q (xi|¬li, α) can be performed as shown above for the prior logistic regression of equations (1)-(6), but with the labels flipped (e.g., the probability that the label $l_i$ is flipped in the training data or that the correct label is ¬$l_i$) such that we are calculating the probability for the incorrect output label (e.g., a "0" or false instead of a "1" or true; or a "1" or true instead of a "0" or false) using equations (1)-(5). This probability P (flip) that a given label is incorrect can be calculated within the context of the model, by using Bayesian statistics to estimate the odds ratio for the flip as equation (8):

$$P(\text{flip})/P(\neg \text{flip}) = (Q(xi|\neg li, \alpha)/Q(xi|li, \alpha)) \times (P(\text{err})/[1-P(\text{err})]) \quad (8)$$

where xi represents the ith data point, a represents the parameters in the model, P (xi|li, α) is shorthand notation for the probability the point xi is predicted as matching the assigned ground truth label li (e.g., the label $l_i$ is correct), P (flip) is a prior on the error rate in the training data (e.g., 10% or 1%), Q (xi|¬li, α) is shorthand notation for the probability the point xi is predicted as not matching the assigned ground truth label li, according to the model (e.g., the label $l_i$ is incorrect), P (¬flip) is 1−P(flip), P(err)/[1−P(err)] can be a prior odds ratio that any given label of the training data is correct (e.g., selected correctly by a person or machine based on the input data). For example, the first term (Q (xi|¬li, α)/Q (xi|li, α)) is a ratio of probabilities that have already been calculated as noted above, and the second term (P(err)/[1−P(err)]) represents a prior odds ratio (or a priori odds ratio) that the point is mislabeled. Thus, equation (8) provides a way to calculate the P(li is correct) terms in equation (7). Plugging equation (8) into equation (7) yields equations (10) and (11) below, which can be solved to produce error tolerant binary classifier or model results.

In the vanilla logistic model of equation (5) the result of equation (8) is zero because whether a training entry known output label is flipped is not considered. In some sense, equations (7)-(8) can be thought of as updating the vanilla logistic model knowledge of equations (1)-(5) using more information, which is the consideration of the probability of the label being incorrect and the priori of the label being incorrect. For example, the first error-tolerant term or likelihood of the label $l_i$ being correct Q ($x_i$|$l_i$, α) and the second error-tolerant term or likelihood of the label $l_i$ being incorrect Q ($x_i$|¬$l_i$, α) of equations (7)-(8) can be calculated using equation (6). The priori can be chosen or selected based on information related to the input and labels of the training data. The priori odds ratio can be identified by a machine detecting or a person observing, a percentage of a different set of data entries that have correctly labeled predicted output labels after being predicted by a trained version of the machine learning binary classifier. The priori odds ratio can be selected automatically by a computer analyzing, or may be determine by a person listening to a portion of the training data to determine its accuracy.

One way of determining the priori may be by training a binary classifier with a portion of known ground truth data and predicting the outputs of the rest of the training data with the trained classifier; and comparing the known ground truth labels with those predicted to determine a percentage of the ones correctly predicted. The percentage can be the priori for that data; similar types of data; or data from that or a similar source. This priori may not be a very accurate determination, but it can be sufficient for training or using an error-tolerant model as the results are not very sensitive to the prior in practice. As noted above, we recover ordinary logistic regression when we set the prior odds to exactly zero.

Equation (7) may be or may be used by a tolerator for tolerating training data that is incorrect for training a binary signal classifier by training the model of equation (7) (e.g., a model that considers the term Q ($x_i$|¬$l_i$, α) or the terms Q ($x_i$|¬$l_i$, α)×P ($l_i$ is wrong)) with that training data. Equation (7) may be or may be used by a tolerator for determining whether training data is incorrect for training a binary signal classifier by considering whether the term Q ($x_i$|¬$l_i$, α) or the terms Q ($x_i$|¬$l_i$, α)×P ($l_i$ is wrong) are greater than a threshold such as the priori odds ratio that the point is mislabeled. Training data entries that are determined to be incorrect may be removed from the set of training data, relabeled, or compared to other data to determine an accuracy score or performance score of such a classifier. As discussed above, since these concepts for a tolerator apply to logistic regression, they can also be applied to the very general problem for a wide class of machine-learning models.

In some cases, equation (7) may be an error tolerant model (and/or a model for determining whether training data is incorrect) by having a model with a first error-tolerant term Q ($x_i$|$l_i$, α) for when the label $l_i$ is correct and a second error-tolerant term Q ($x_i$|¬$l_i$, α) for when the label $l_i$ is incorrect (and thus for a binary classifier, ¬$l_i$ is the correct label). In one case, if the label $l_i$ is incorrect for a training data entry, that entry is incorrect and should not be used to train the model, such as of vanilla logistic equation (5). However, in other cases, such an entry can be considered or used to train the model of equations (7)-(8) without having a devastating effect on training the model. Specifically, although the label $l_i$ is incorrect for a training data entry of a vanilla logistic equation (5), it is tolerated by equation (7) because equation (7) includes the term Q ($x_i$|¬$l_i$, α) or the terms Q ($x_i$|¬$l_i$, α)×P ($l_i$ is wrong). Thus, although incorrect training data or training data with incorrect output labels (e.g. points) are used to train equation (7) those points will not have a devastating effect on training the model. Notably, equation (7) can be an accurate or correct model after being trained with training data entries that include, and without knowing which training data entries include, incorrect training data or training data with incorrect known output labels. Consequently, equation (7) is not very sensitive to mislabeled known output data points, does not cause a huge swing in the fit of the data to the model for mislabeled known output data points.

Equation (7) defines the likelihood in terms of things like P(li is wrong), and equation (8) those terms to be expressed in a more convenient way. Returning to the example of the model being used to predict a purchase during a phone call, if an administrator or trained agent listens to audio input data of a phone call (or reads a transcription of that input) and selects an output label (e.g., creates a known output) for that data, then the label for that training data entry may be 95% correct or the priori P(err) is 1/20 that the label is incorrect. While for a combination of input data sources and labels, such as merged spread sheets of inputs and output labels, and a best guess at an output label selected by the agent from those spreadsheets, then the label for that training data entry may be 67% correct or the priori P(err) is 1/3 that the label is incorrect. However, the results of equation (7) are not be very dependent on the priori when the priori is not close to zero and the likelihoods of being correct or incorrect are large. In this case the likelihoods will take over equation (7) or (8). For instance, the results of equations (7)-(8) are the priori when the likelihoods are equal, but changes as the likelihoods increase towards correct or incorrect. Thus, if a training data entry label has equal likelihoods, then the likelihood or odds ratio for the flip of equation (8) is the priori. However, if a training data entry label is farther out in magnitude of one of the likelihoods (e.g., the extra information of how consistent the training data entry input and output are with the currently trained model), the equations (7) and (8) will be quickly overcome by the likelihoods since those are sigmoid functions. The updated odds ratio of equations (7) and (8) will allow the choice of leaving out that training point by considering or tolerating that point using equation (7) instead of forcing the point into the models training using equation (5), which can have devastating effects on the trained model.

In this example of the model being used to predict a purchase during a phone call, the input data can be the single words spoken during the phone conversation (e.g., as text or audio input data); the output is the label of sale or no sale; alpha represents all of the parameters in the model. The model of equation (7) is fit to the training data by estimating the model's parameters that best or most accurately fit the training data to the model. This fitting may include determining the alphas that line up the data with the model by maximizing the likelihood that each label is correct and minimize the likelihood that each label is incorrect to maximize the probability of all training data entries fitting the mode. In some cases, equation (7) determines the weight of an output point and that point's training entry on the model; then taking the derivative of or optimizing equation (7) to get alpha so that the training data points match the model, and thus train the model.

In the case of logistic regression, the probabilities $Q(xi| \ldots )$ in equation (7) (e.g., see equations 4 and 6) may be determined by counting up the tallies of words that happen on a training call input data and comparing that to the model parameters alpha for which words correlate with which outcomes (which known labels). This comparison is concisely expressed via theta in equations (3)-(4). Theta may be based on or used to disambiguate different calls. In some cases, theta is determined by observing all the words that are said on a call and count up the instances of each word. Different groups of words correlate with different outcomes or known training data outputs or labels that are use that to calculate the theta parameter during training. Each word (number of times said/exits) can be counted up for a call and the more times a word is in a call with a label true/sale, and theta is determined by adding all the words in the call together and comparing to the model parameters using equation (4) or the unnumbered equation immediately following equation (3). Then an overall likelihood can be calculated for a model using equations (3), (7), and (8). The training data is considered using equation (7) where each training data entry may be the words spoken on a call and the known or selected output label; along with a priori of the label being correct (e.g., along with P(err)/[1−P(err)]) to predict an outcome of whether the entry is worthy of (not incorrect) for use in training based on equation (7). That is, equation (7) will tolerate incorrect labels, even if they have theta values with large magnitude.

In this example where we consider logistic regression, alpha ($\alpha$) is the weight applied to each word for predicting a true outcome label. Alpha can be a big list or numbers, there is one number for each word in the English language. Every time that word appears (e.g., in an input for which the output is true—sale), the model is tipped a little more towards true and alpha says how much to tip the model towards true. The predicted or selected alpha is ultimately the one chosen that gives the best model. Using equation (5), an incorrect label that has a high theta would throw out other consistent values, such as hundreds of calls in order to fit this one. However, using equation (7), the incorrect label appears as very inconsistent and thus is tolerated due to consideration of whether it is mislabeled using the second sigmoid and priori.

Figure 5:
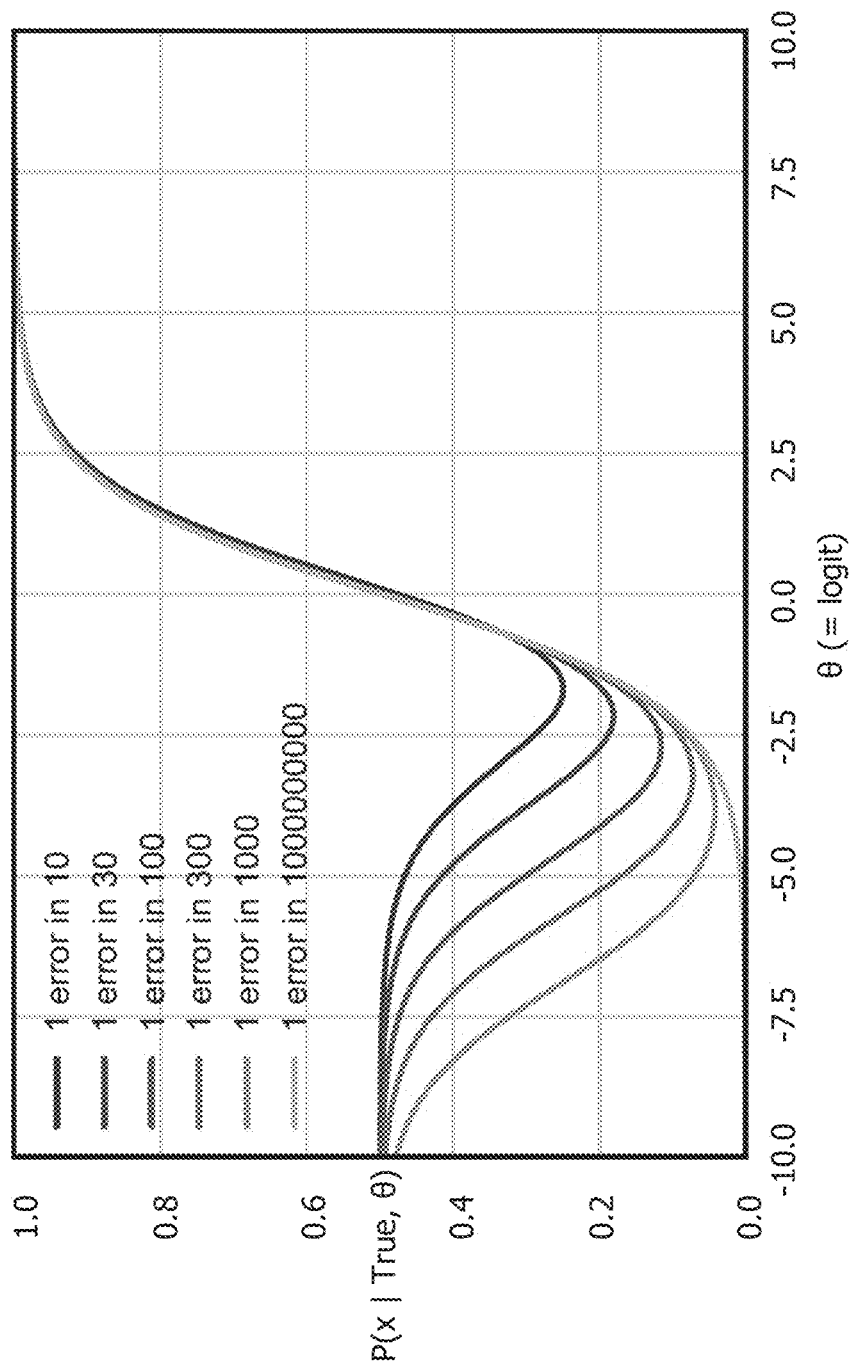
FIG. 5 is a plot showing predicted probabilities that a training data output label is correct according to the logistic regression error-tolerant model for a label of true and various choices of the priori odds ratios.

For example, FIG. 5 is a plot 500 showing predicted probabilities that a training data output label is correct according to the logistic regression error-tolerant model of equation (7) for a label of true and various choices of the priori odds ratio for the output label being correct. Plot 500 may be or may be used by a tolerator to determine whether training data is incorrect for training, tolerate such incorrect data during training, remove such incorrect data from the training data, and/or determine an accuracy score or performance score of such a classifier such as described for a tolerator using equation (7). The plot 500 plots the predicted probabilities that a training data output label is consistent with the supplied ground truth label against an X-axis of that probability and a Y-axis of theta.

Plot 500 nicely demonstrates how inaccurate and dangerous the standard algorithm of equations (5)-(6) are without considering the alternative possibility of the label being flipped in equations (7)-(8). Plot 500 only starts to look like standard logistic regression of equations (3) when one billion to one priori odds are assigned that the training output labels are correct. Even with thousand to one odds, i.e., a 99.9% confidence in the training data labels, plot 500 is a dramatic modification to the standard algorithm of equation (3).

For some embodiments of plot 500, theta, the X-axis, is calculated from the words or input data of each call. For example, if theta>0 the outcome (e.g., output label of a sale being made) is probably true, a purchase was probably made according to the model; and if theta<0 the outcome is probably false, a purchase was probably not made according to the model. Rather than training a model with the ground truth label, or yes/no of the sale, equation (7) attaches a probability to the outcome by comparing this call to the rest of the dataset; e.g., 70% probability a purchase happened on this call/input data. Then the curve for a purchase happening is calculated using the equation. In plot 500 if theta is 2.5 then there is a 90% probability of a true/purchase. For theta greater than zero, the curves shown in plot 500 are about the same an equation (7) does not really a change for outcomes that are consistent. When theta less than 0, the vanilla standard logistic function of equation (5) plummets to 0, but varies for equation (7) as shown in plot 500 based on the value of the priori odds ratio of the label being correct. If theta is −10 then for equation (3) there is a 22000 to 1 odds that outcome cannot be true/is false. But for the phone sale example, the confidence that any given label/entry is incorrect is really not 22000:1—even the best human labels are not this accurate! So, equations (7)-(8) (error tolerant) soften the logistic regression equation so then rather than plummeting to 0 for points which are very inconsistent, such as ones with theta less than −5 to −10, equations (7)-(8) asymptote to 0.5 or 50% confidence, allowing these points to be used for training the model but not having a large effect on whether the other training data will be considered. Thus, for these values of theta plot 500 shows various curves based on the priori, that asymptote to 0.5 or 50% confidence, so that strongly inconsistent points are simply ignored by the model.

For example, calculating equation (8) if initially there is a 99% confidence in a set of training data labels (e.g., a ground truth labels), a 100:1 a priori odds ratio can be assigned that any given label is correct. But when training the model, there may be a point that does not seem to fit. Here, theta=−10.

In a standard vanilla logistic regression of equation (3), we would assign an odds of 22,000:1 that the model is inconsistent with this point. Even though we may assume a 1% error rate in the data, an inconsistency of this magnitude would lead to large changes in the model parameters and would have a destructive effect on the trained model. Effectively, hundreds of training entries would be ignored and not fit to the model as a result of forcing this entry to fit due to its theta being so large. However, using equation (7) and plot 500 we can see that this theta value is strongly inconsistent with the rest of the dataset. A model trained using equation (7) therefore assigns 50:50 odds that this point is consistent with the model, effectively ignoring the inconsistent datapoint. That is, here for equation (7), $Q(x_i | \neg l_i, \alpha) \times P(l_i$ is wrong) is roughly equal to 0.5.

For example, these resulting likelihood functions for this example can be described graphically. FIG. 6 is a plot 600 showing predicted probabilities that a training data output label is correct according to the logistic regression error-tolerant model of equation (7) for a label of true and the choice of the priori odds ratio of 100:1 that any given label of the training data is correct from FIG. 5. Plot 600 may show the probability for our example of audio training data entries having telephone call audio data inputs and known output labels of true indicating that a purchase of a product did occur during the call.

FIG. 7 is a plot 700 showing predicted probabilities that a training data output label is correct according to the logistic regression error-tolerant model of equation (7) for a label of false and one choice of the priori odds ratio of FIG. 6. Plot 700 can be described as having a nearly mirror image type probability as compared to plot 600. Plot 700 may show the probability for our example of audio training data entries having telephone call audio data inputs and known output labels of false indicating that a purchase of a product did not occur during the call.

Plots 600 and 700 may be or may be used by a tolerator to determine whether training data is incorrect for training, tolerate such incorrect data during training, remove such incorrect data from the training data, and/or determine an accuracy score or performance score of such a classifier such as described for a tolerator using equation (7).

The plots 600 and 700 plot the predicted probabilities that a training data output label true and false, respectively, are consistent with the model as a function of theta on the X-axis and a Y-axis of theta.

For our example, we can see that for theta −10 the plot 600 shows a probability that a ground truth label of "True" is consistent with the model with a probability of about 0.38 or 38 percent. This percentage is close to 50/50, indicating that this point is essentially ignored when training a model using or having equations (7) and (8).

In our phone example, the model of equation (7) can be trained where Pi is a product of all training data calls, inside square bracket is summing two terms and that are from plots 600 and 700 (e.g., if the known output label li is true use plot 600, if li false use plot 700) to get the numbers in the brackets of equation (7) for a single call. Then the terms in the brackets are multiplied together for all calls of the training data to get l. l is optimized to determine the trained model of equation (7).

In general, the error-tolerant model of equation (7) works really well as a binary classifier. It has much better tolerance for bad labels than the normal vanilla logistic regression of equation (5). It does require selecting prior probabilities for the label correctness, and this choice can have an influence on the fit of the data to the model curve. So, this selection does need to be reasonable, but it is possible for a model to not be terribly sensitive to this choice.

As described above the error tolerant model of equation (7) includes logistic regression. This model marginalizes over the possibility that each entry in the training data may be mislabeled, and uses the likelihood function along with a prior to make that determination. Because of that, this model is cubic in function rather than linear in it and that is punishing for floating point arithmetic such as performed by the computer.

For example, in some cases, equation (7), may by written another way, such as shown by equations (10) and (11):

$$Q(x_i | \ell_i = \text{True}) = \frac{1}{1+e^{-\theta_i}} \frac{1+e^{\beta_T - 2\theta_i}}{1+e^{\beta_T - \theta_i}} \quad (10)$$

$$Q(x_i | \ell_i = \text{False}) = \frac{e^{-\theta_i}}{1+e^{-\theta_i}} \frac{1+e^{\beta_F - 2\theta_i}}{1+e^{\beta_F - \theta_i}} \quad (11)$$

where equation (10) applies in the case that the label Li is true in equation (7) and equation (11) applies in the case that the label Li is false in equation (7). The addition term "+" in the numerator of equations (10) and (11) is the addition term "+" which adds the left and right terms in equation (7). It is understood that references herein to equation (7) include equations (10) and (11); and vice versa.

For example, in order to train a binary classifier model, the likelihood of training data points (inputs and outputs) matching or mapping to the model Q (xi|li=True) or Q (xi|li=False) can be calculated using a model having or that is equations (10) and (11) where xi represents the ith data point (e.g., training data known input) that the assigned ground truth label li (e.g., training data known output) is labeling, θ is the logit determined by the model (e.g., detailed in paragraph 63 for logistic regression or in paragraph 68 for a multilayer perceptron neural network model) using equation, βT is log[P(err|li=True)/(1−P(err|li=True))], and βF is log[P(err|li=False)/(1−P(err|1 I=False))].

This process of equations (10) and (11) considers alternative possibilities or is marginalizing the model over alternative possibilities of the label being incorrect as noted for equation (7). For example, if a point is labeled True, for this point θ=−25, and that the prior on the error rate is 2.5% so that βT=−3.7.

In this case, using a computer to directly evaluate equation 10, the probability of the data matching the model comes out to 100%, which cannot be correct! That probability results from multiplying three numbers that are (1/100 billion) times 100 billion billion times (1/10 billion). This is not good for model accuracy (e.g., accuracy or performance score) and it can easily lead to numeric overflow or underflow during computer computation.

So, an approximate model a model has been developed that adds these terms rather than multiplies them. Thus, this model is less vulnerable to overflow and underflow errors and can be readily evaluated using a digital computer.

For example, in some cases, equations (10) and (11), may by written another way, such as shown by equations (12) and (13):

$$\tilde{Q}(x_i \mid \ell_i = \text{True}) = \frac{1}{1+e^{-\theta_i}} + \frac{1}{1+e^{a\theta_i - a^2\beta_T}} \quad (12)$$

$$\tilde{Q}(x_i \mid \ell_i = \text{False}) = \frac{1}{1+e^{\theta_i}} + \frac{1}{1+e^{-a\theta_i - a^2\beta_T}} \quad (13)$$

where $a(\beta) \equiv 1 + 2\exp(\beta)$, the other variables are the same as for equations (10) and (11), equation (12) applies in the case that the label Li is true in equation (7) and equation (13) applies in the case that the label Li is false in equation (7). In some case, each of equations (12) and (13) may be an approximation of (approximate functions of) each of equations (10) and (11), respectively, that each include the addition term "+" between the left and right side of these equations (12) and (13) so that each of equations (12) and (13) do not include any multiplications (e.g., as compared to equations (10) and (11) which each do have a multiplication). Equations (12) and (13) may be an approximation of (approximate functions of) equations (10) and (11) determine by statistical or model trial and error. It is understood that references herein to equation (7) can also refer to equations (12) and (13) in addition to equations (10) and (11). In some cases, equations (12) and (13) are double-sigmoid equations by having a first sigmoid function before the "+" symbol and a second sigmoid function after the "+" symbol.

For example, in order to train a binary classifier model, the likelihood of training data points (inputs and outputs) matching or mapping to the model Q (xi|li=True) or Q (xi|li=False) can be calculated using a model having or that is equations (12) and (13).

This process of equations (12) and (13) considers alternative possibilities or is marginalizing the model over alternative possibilities of the label being incorrect as noted for equation (7).

Equations (12) and (13) are a good or accurate approximation of equations (10) and (11) up to about a 5% difference for error rates in Q of up to about 15%. That is, for prior up to 15% the difference between equation (10) and (12) is less than 5%; and the difference between equation (11) and (13) is less than 5%. Thus, equations (12) and (13) are more than sufficient for determining whether training data is incorrect for training a binary signal classifier, tolerating such incorrect data and removing such incorrect data. This is especially true since the logistic regression model of equation (7) (or indeed any model) is approximate in the first place, and thus there is no real sense in working to reproduce it exactly.

For example, FIG. 8A shows plots 800 of the resulting likelihood function on the X-axis for equation (12), and FIG. 8B shows plots 850 of the difference in percentage on the X-axis between this resulting likelihood function and the function of equation (10) for a label of true and when the priori is 15%, 10% and 5%. The Y-axis for both plots is theta θ, from θ=−10 to θ=+10 such as it is for FIG. 5. It can be seen in FIG. 8B that the difference has a maximum of about 5%, 4% and 2.5% near θ=0 when the priori is 15%, 10% and 5% (respectively) and becomes zero when θ<−4 and θ>+2.5.

Next, FIG. 8C shows plots 860 of the resulting likelihood function on the X-axis for equation (12), and FIG. 8D shows plots 870 of the difference in percentage on the X-axis between this resulting likelihood function and the function of equation (10) for a label of true and when the priori is 1.0%, 0.5%, 0.1% and 0.0%. The Y-axis for both plots is theta θ, from θ=−10 to θ=+10 such as it is for FIG. 5. It can be seen in FIG. 8D that the difference has a maximum of about 1%, 0.5%, 0.15% and 0% near θ=0 when the priori is 1.0%, 0.5%, 0.1% and 0.0% (respectively) and becomes zero when θ<−4 and θ>+2.5.

In some cases, FIG. 8A and C are plots 800 and 860 showing predicted probabilities that a training data output label is correct according to the logistic regression double-sigmoid model of equation (12) for a label of true and the choice of the priori odds ratio of 15%, 10%, 5%, 1.0%, 0.5%, 0.1% and 0.0% that any given label of the training data is correct. Plots 800 and 860 may show the probabilities for our example of audio training data entries having telephone call audio data inputs and known output labels of true indicating that a purchase of a product did occur during the call.

Next, FIG. 9A shows plots 900 of the resulting likelihood function on the X-axis for equation (13), and FIG. 9B shows plots 950 of the difference in percentage on the X-axis between this resulting likelihood function and the function of equation (11) for a label of false and when the priori is 15%, 10% and 5%. The Y-axis for both plots is theta θ, from θ=−10 to θ=+10 such as it is for FIG. 5. It can be seen in FIG. 9B that the difference has a maximum of about 5%, 4% and 2.5% near θ=0 when the priori is 15%, 10% and 5% (respectively) and becomes zero when θ<−2.5 and θ>+4.

Figure 9C:
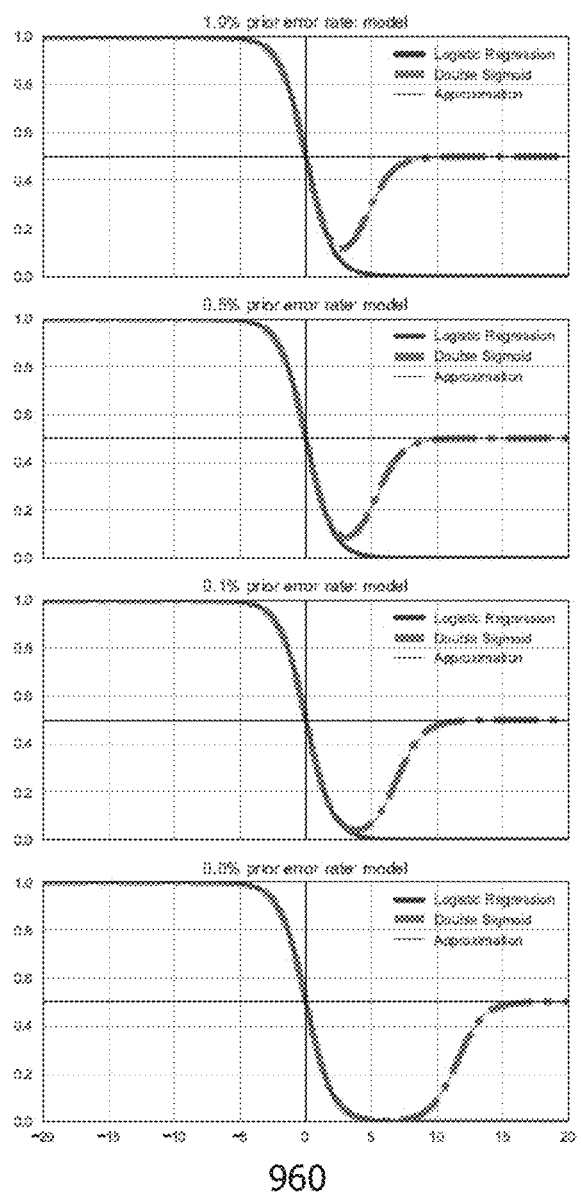
FIG. 9C shows plots of the resulting likelihood function on the X-axis for an approximation of a logistic regression double sigmoid model for a label of false and when the priori is 1.0%, 0.5%, 0.1% and 0.0%.
Figure 9D:
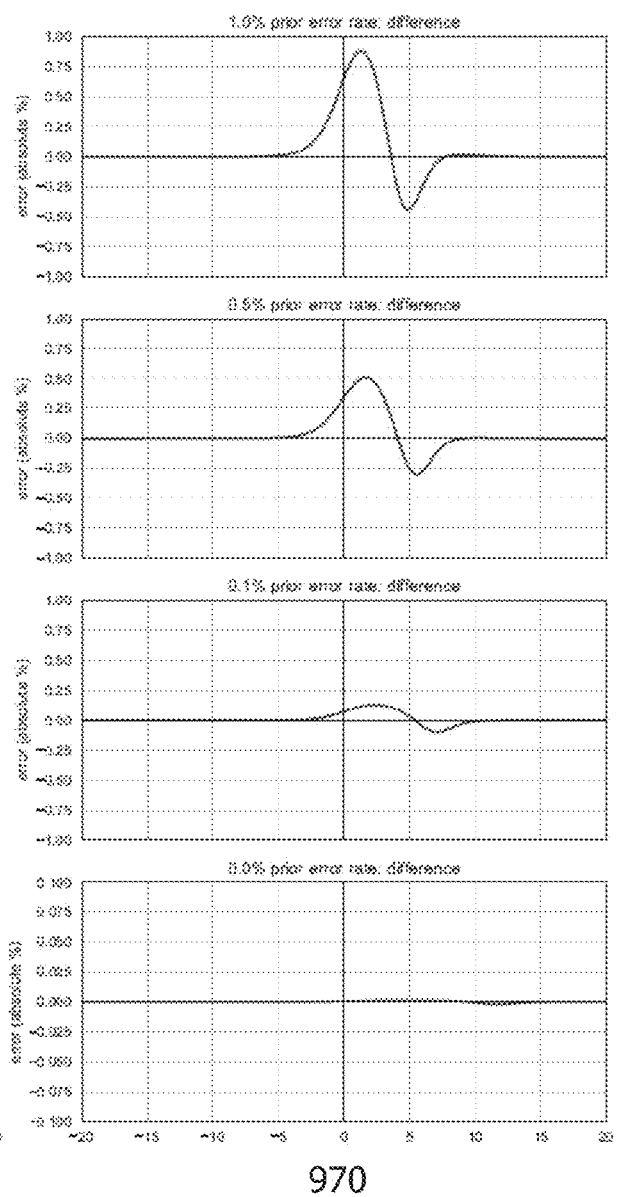
FIG. 9D shows plots of the difference in percentage on the X-axis between the resulting likelihood function of FIG. 9C and a non-approximation logistic regression double sigmoid model.

Next, FIG. 9C shows plots 960 of the resulting likelihood function on the X-axis for equation (13), and FIG. 9D shows plots 970 of the difference in percentage on the X-axis between this resulting likelihood function and the function of equation (11) for a label of false and when the priori is 1.0%, 0.5%, 0.1% and 0.0%. The Y-axis for both plots is theta θ, from θ=−10 to θ=+10 such as it is for FIG. 5. It can be seen in FIG. 9D that the difference has a maximum of about 1%, 0.5%, 0.15% and 0% near θ=0 when the priori is 1.0%, 0.5%, 0.1% and 0.0% (respectively) and becomes zero when θ<−2.5 and θ>+4.

In some cases, FIG. 9A and C are plots 900 and 960 showing predicted probabilities that a training data output label is correct according to the logistic regression double sigmoid model of equation (13) for a label of false and the choice of the priori odds ratio of 15%, 10%, 5%, 1.0%, 0.5%, 0.1% and 0.0% that any given label of the training data is correct. Plots 900 and 960 may show the probabilities for our example of audio training data entries having telephone call audio data inputs and known output labels of true indicating that a purchase of a product did not occur during the call. Plots 900 and 960 can be described as having a nearly mirror image type probability (e.g., with respect to a vertical line at θ=0) as compared to plots 800 and 860, respectively.

Plots 800-970 may be or may be used by a tolerator to determine whether training data is incorrect for training, tolerate such incorrect data during training, remove such incorrect data from the training data, and/or determine an accuracy score or performance score of such a classifier such as described for a tolerator using equations (12) and (13). Thus, the estimation of equations (12) and (13) is within a few percent which does not have much of an effect on the trained binary classifier, while allowing the large numbers of those equations to be added instead of multiplied, thus avoiding overflow and underflow issues when the likelihoods of those equations are calculated for large positive and negative theta values.

In some cases, the word 'sigmoid' refers to models like logistic regression or neural networks (both of which use equation (3) to estimate probabilities). However, the concepts described with respect to equations (7)-(13) are more general than that and can be applied to any machine learning model with a probabilistic interpretation, regardless of whether it uses the sigmoid function.

Figure 10:
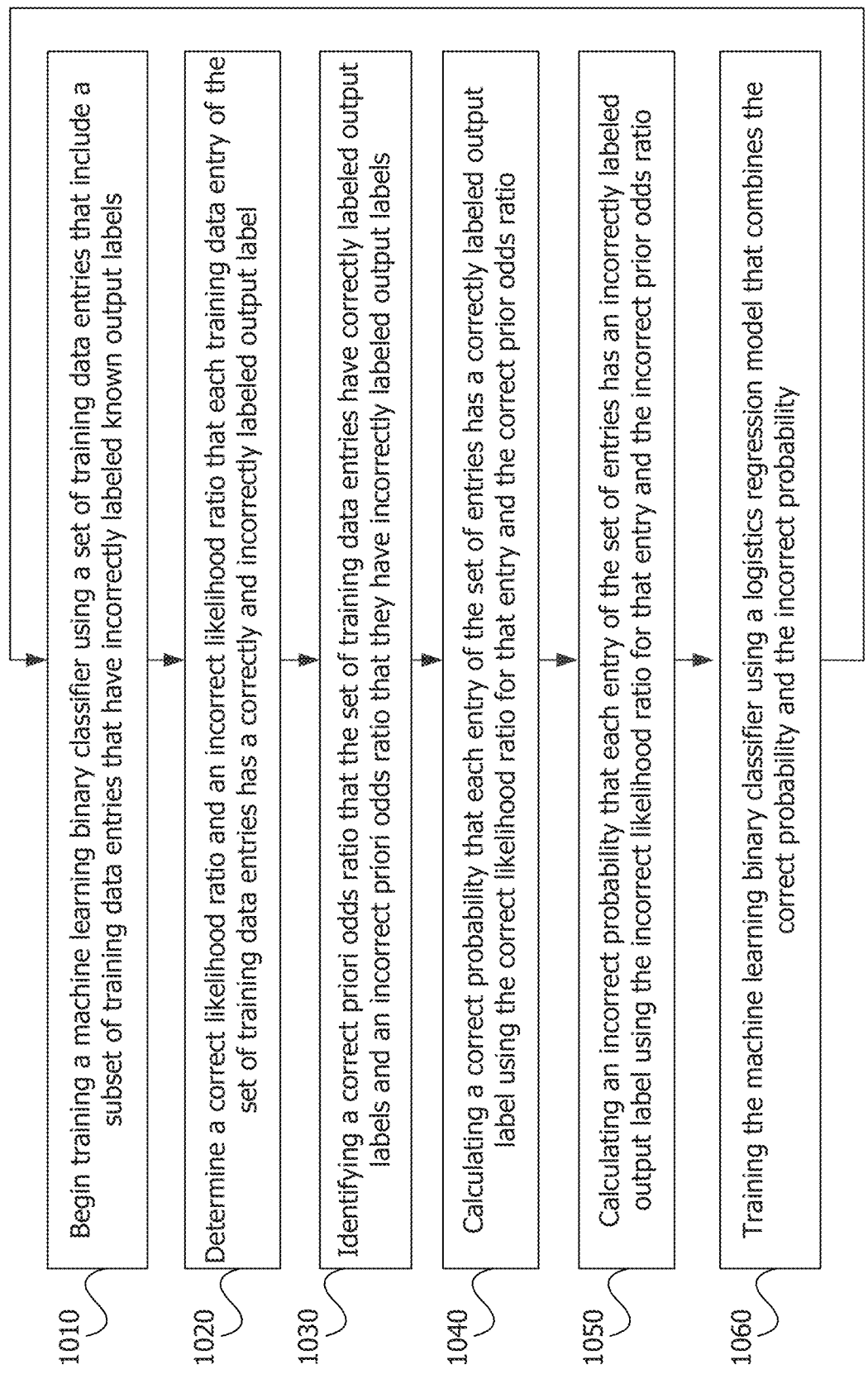
FIG. 10 is an operating environment/process for automatically tolerating training data that is incorrect when training a machine learning binary classifier.

FIG. 10 is an operating environment/process 1000 for automatically tolerating training data that is incorrect when training a machine learning binary classifier. Process 1000 begins at 1010 and ends at 1060 but can optionally be repeated, such as shown by the arrow from 1060 to 1010. For example, process 1000 can be repeated for different classifiers or after updating the parameters of a single classifier. Using process 1000, training data that is incorrect can be automatically tolerated by a tolerator or a machine learning binary classifier that is trained with a set of training data entries with a subset of training data entries that have incorrectly labeled known output labels.

At 1010 a machine learning binary classifier begins to be trained using a set of training data entries with a subset of training data entries that have incorrectly labeled known. Training at 1010 may include a tolerator or a machine learning binary classifier beginning to be trained by a person and/or computing device, with a set of training data entries that each have known inputs and a known output label and have the subset with incorrectly labeled known output labels.

After 1010, at 1020 training continues by determining a correct likelihood ratio that each training data entry of the set of training data entries has a correctly labeled output label and an incorrect likelihood ratio that each training data entry of the set of training data entries has an incorrectly labeled output label. Determining at 1020 may include a computing device determining the correct and incorrect likelihood ratios for each training data entry using a computer model of the tolerator or of the machine learning binary classifier.

Determining the correct likelihood ratio may include fitting a first logistic regression model to each entry of the training data and determining the incorrect likelihood ratio comprises fitting a second logistic regression model to each entry of the training data; and fitting comprises minimizing a likelihood function that each entry of the training data fits a logistic regression model to estimate model parameters of a logistic regression model.

Training at 1020 may include the tolerator determining a correct likelihood ratio $Q(x_i|l_i, \alpha)$ that each training data entry of the set of training data entries has a correctly labeled output label and an incorrect likelihood ratio $Q(x_i|\neg l_i, \alpha)$ that each training data entry of the set of training data entries has an incorrectly labeled output label.

Determining the correct likelihood ratio at 1020 may be fitting a first logistic regression model to each entry of the training data and determining the incorrect likelihood ratio at 1020 is fitting a second logistic regression model to each entry of the training data. Here, fitting is minimizing a likelihood function that each entry of the training data fits a logistic regression model to estimate model parameters of a logistic regression model. The correct likelihood ratio may be a first sigmoid term for a label $l_i$ being correct, and the incorrect likelihood ratio may be a second sigmoid term for a label $l_i$ being incorrect that is a mirror image of the first sigmoid term.

Plotting the correct likelihood ratio and incorrect likelihood ratio for the set of training entries may be done using the binary classifier trained with the set of training entries such as shown in FIGS. 5-7; and determining an approximated correct likelihood ratio and an approximated incorrect likelihood ratio by performing an estimation of the plots such as shown in FIGS. 8-9.

After 1020, at 1030 training continues by identifying a correct priori odds ratio that the set of training data entries have correctly labeled output labels and an incorrect priori odds ratio that the set of training data entries have incorrectly labeled output labels. Training at 1030 may include a person estimating or computing device using a computer model to calculate the correct and incorrect priori ratio for each training data entry. Training at 1030 may include the tolerator identifying a correct priori odds ratio $P(l_i$ is correct) that the set of training data entries have correctly labeled output labels and an incorrect priori odds ratio $P(l_i$ is wrong) that the set of training data entries have incorrectly labeled output labels.

After 1030, at 1040 training continues by calculating a correct probability that each entry of the set of entries has a correctly labeled output label using the correct likelihood ratio for that entry and the correct prior odds ratio. Calculating at 1040 may include a computing device calculating the correct probability for each training data entry using a computer model of the tolerator or of the machine learning binary classifier. Calculating the correct probability for each entry may include multiplying the correct likelihood ratio and the correct prior odds ratio. In other cases, this calculation is an addition of terms based on the likelihood ratio for that entry and terms based on the prior odds ratio. For example, here, calculating the correct probability for each entry includes adding the correct likelihood ratio and the correct prior odds ratio.

After 1040, at 1050 training continues by calculating an incorrect probability that each entry of the set of entries has an incorrectly labeled output label using the incorrect likelihood ratio for that entry and the incorrect prior odds ratio. Calculating at 1050 may include a computing device calculating the incorrect and incorrect probability for each training data entry using a computer model of the tolerator or of the machine learning binary classifier. Calculating the incorrect probability for each entry may include multiplying the incorrect likelihood ratio and the incorrect prior odds ratio. In other cases, this calculation is an addition of terms based on the likelihood ratio for that entry and terms based on the prior odds ratio. For example, here, calculating the incorrect probability for each entry includes adding the incorrect likelihood ratio and the incorrect prior odds ratio.

After 1050, at 1060 training is completed by training the machine learning binary classifier using a logistic regression model that combines the correct probability and the incorrect probability. Completing at 1060 may include a computing device a computer model of the tolerator or of the machine learning binary classifier using a logistic regression model that combines the correct probability and the incorrect probability.

The logistic regression model may include multiplying the correct probability and the incorrect probability. In other cases, logistic regression model includes adding the correct probability and the incorrect probability.

Training at 1010-1060 may include descriptions herein for using equation (7), using a tolerator or tolerating incorrect training data.

As noted, most machine learning models are highly intolerant of incorrect training data such as mislabeled ground truth points. This intolerance results from a statistical assumption which is baked into these models at a pretty fundamental level. Moreover, human spot-checking several datasets has shown that mislabeled points can be expected at a level which could seriously damage standard machine learning models such as logistic regression. In some cases, this is a very real problem and it is quite clear that mislabeled ground truths are the limiting factor in a model's prediction accuracies.

The good news is that as noted above, an alternative machine-learning model has been developed which is inherently insensitive to (e.g., tolerates) mislabeled ground truth points. So, in a sense, this problem has been solved. The bad news is that there is a difficulty in measuring the accuracies or performance of these models.

Figure 11A:
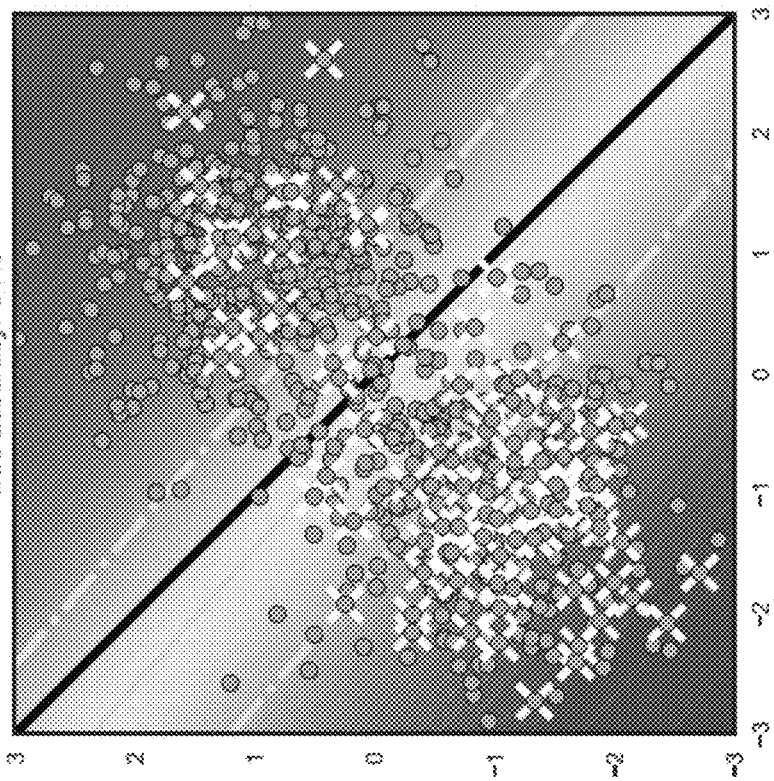
FIGS. 11A-B show plots of a dividing line between true and false points of training data that includes data with mislabeled or incorrect known outputs for a double sigmoid logistic regression model and a vanilla logistic regression model of equation.
Figure 11B:
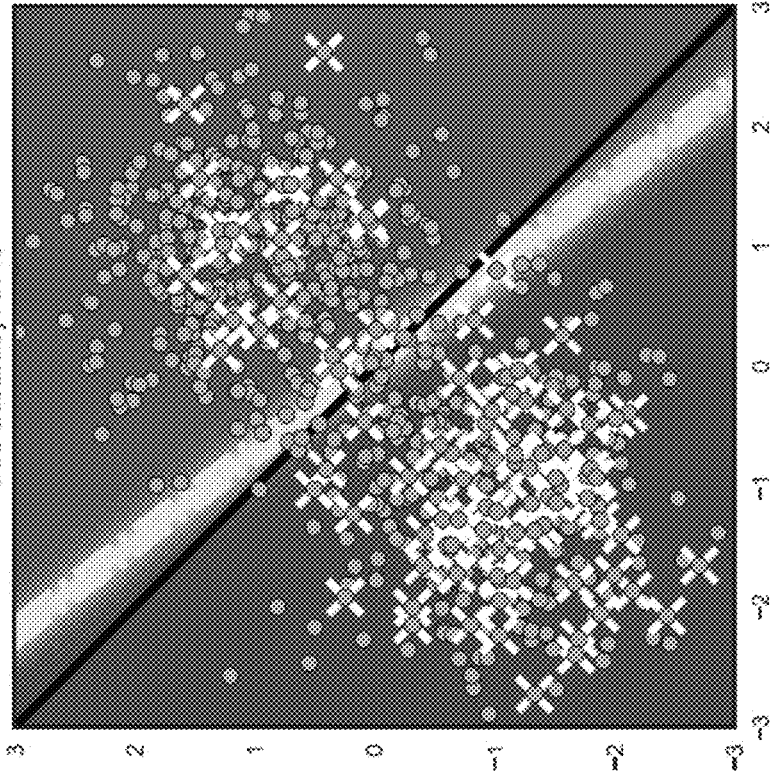

This problem is demonstrated with a few examples. Specifically, FIGS. 11A-B show plots 1100 and 1150 of a dividing line between true and false points of training data that includes data with mislabeled or incorrect known outputs for a double sigmoid logistic regression model of equations (7)-(13) and a vanilla logistic regression model of equation (5). Plot 1100 can be for any of the models using equation (7), such as with or without the approximation of equations (12)-(13).

Plots 1100 and 1150 show two clusters of points of the output labels: one shaded blue, and one shaded red. This set of training data was created by a person so true dividing line between these clusters of points is known and shown with a thick black line, as are the subset of points having flipped labels. The points of the subset that are these bad points (e.g., having flipped labels) are each marked with a white 'X'. The logistic regression models are then fit to this data and the results are shown in the plots where the solid bright line shows each model's estimate for the dividing line between the clusters, and the dashed bright lines show the uncertainty in this estimate. A successful model would produce a bright line which closely tracks the black line, and few if any points should fall in the uncertain interval between the dashed bright lines.

Plots 1100 and 1150 compare the error-tolerant "double sigmoid" model (left) to standard logistic regression (right). Above each plot, FIGS. 11A and 11B quote the reported accuracy (e.g., accuracy score or performance score), which is calculated using the supplied training data (e.g., ground truth) labels, and the true accuracy, which is calculated using the actual ground truth labels. (It sounds line nonsense to talk about incorrect "ground truths," but that's the lexicon we've established!) The reported accuracy for the double sigmoid model, as measured against the ground truth labels is 86% while its true accuracy is 97%; the reported accuracy is limited to the accuracy of the ground truth labels. Ordinary logistic regression also suffers from this effect, with reported and true accuracies of 72% and 81%, respectively.

The plots 1100 and 1150 show that the double-sigmoid model does very well in real terms, but that the reported accuracies are systematically low because we're penalized for the points which we correctly classified, but which were mislabeled. That is, the reported accuracy for the double sigmoid model is 86% when it should be much closer to the actual 97% but is the lower percent because the model has tolerated the mislabeled training data points.

To be clear, this is a problem from a usability perspective, or from a marketing perspective, not from a statistical perspective. In these cases, the double-sigmoid model automatically does the "right" thing, but the reported accuracy does not give credit for that because the labels are wrong. For example, when the label of a training data (e.g., ground truth) label is wrong it will show up as an accurate prediction for the vanilla logistic regression trained old model which makes the wrong prediction but that prediction matches the mislabeled label; but show up as an inaccurate prediction for the trained new double sigmoid model which makes the correct prediction but that prediction does not matches the mislabeled label! Hence the accuracy goes down when the new model does the right thing and tolerates the wrong label because it's predicted with such a high confidence.

Consequently, in practice, unless it is known beforehand which labels are incorrect, it is difficult to demonstrate that the double sigmoid model did the right thing using the reported accuracy. Notably, it is not clear how to report the double sigmoid model's accuracy when the ground truth labels can not be trusted (e.g., may include inaccuracies). In other words, how can the double sigmoid model's accuracy be estimated despite having incorrect ground truth labels.

One way to more accurately determine a (e.g., any) binary classifier's accuracy when the ground truth labels include inaccuracies is to flag all of the incorrect labels (e.g., bad points) of training data which do not fit the model and either correct (e.g., label as the opposite) or remove the training data for these bad points. Once this is done, the accuracy score will take credit for correctly predicting labels (e.g., in our example, classifying calls) with incorrect labels (or at least to not be penalized for it!). In principle, this should be straightforward, because flagging suspicious data points is essentially what the double-sigmoid model already does. The double-sigmoid error-tolerant models first calculate the probability that each point in the training dataset is mislabeled, and then weight each point in the loss function according to this uncertainty.

But this is not a straightforward process because there is a danger of being fooled here. If all of the points which do not fit the model are simply removed from the training data before training the model, then of course the model will reach 100% accuracy. Without having a human investigate each of the points to be remove (or at least a statistical sample of them), it is hard if not impossible to guarantee the accuracy score is not a tautological fool's paradise.

Figure 12A:
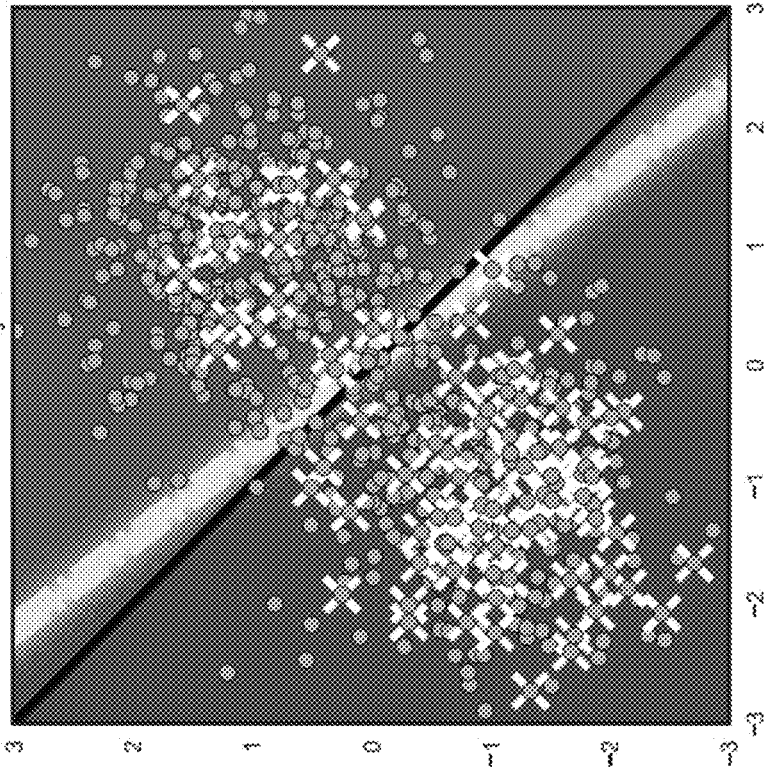
FIGS. 12A-B show plots of a dividing line between true and false points of training data that includes data with mislabeled or incorrect known outputs for the double sigmoid logistic regression model for FIG. 11A and for cleaned data.
Figure 12B:
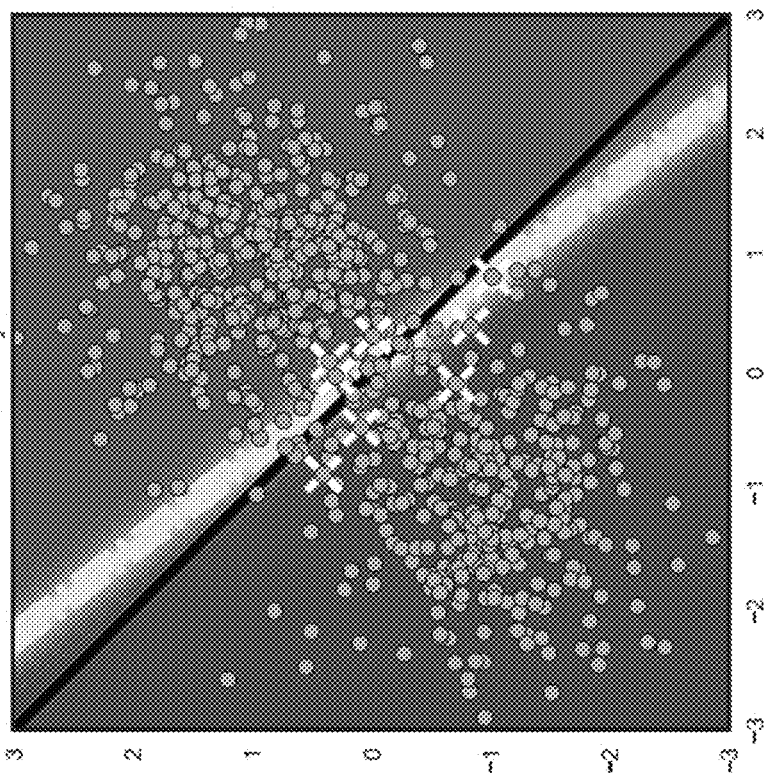

The successful results of automatically, more accurately determining any binary classifier's accuracy when training data includes inaccurate labels as described herein can be demonstrated with a few examples. Specifically, FIGS. 12A-B show plots 1200 and 1250 of a dividing line between true and false points of training data that includes data with mislabeled or incorrect known outputs for the double sigmoid logistic regression model of equations (7)-(13) for the original data of plot 1100 as plot 1200 and for cleaned data as noted herein as plot 1250. Plots 1200 and 1250 can be for any of the models of equations (7)-(13), such as with or without the approximation of equations (12)-(13).

Here, plot 1200 is the same as plot 1100 for the original training data that is the same uncleaned data as that used in plot 1100; and the binary classifiers in plots 1200 and 1250 are identical to the one shown in 1100. This could be using any model based on equations (7)-(13) including logistic regression, neural networks, etc. Plot 1200 compares the error-tolerant model to the raw training data, while plot 1250 compares the model to a "cleaned" dataset in which the model was used to remove points which were likely mislabeled (i.e., P(li is wrong)>0.975 from equation (7)). In some cases, the cleaned data set is created by solving equation (7) to find for which of the training data entries the term P(li is wrong) and removing those entries from the cleaned training data, such as by simply tossing points where P(li is wrong) >0.975 or some other threshold greater than 95 percent. Plots 1200 and 1250 show the same markings and colors for the clusters of points as in plot 1100.

Above each plot, FIGS. 12A and 12B quote the reported accuracy (e.g., accuracy score or performance score), which is calculated using the supplied training data (e.g., ground truth) labels, and the true accuracy, which is calculated using the actual ground truth labels. The reported accuracy for the double sigmoid model is 86% for the original, uncleaned dataset while it is 96% for the cleaned dataset. The true accuracy in both cases is 97%.

The plots 1200 and 1250 show that automatically, more accurately determining any binary classifier's accuracy when training data includes inaccurate labels as described herein does an excellent job of identifying mislabeled calls, without sacrificing many (if any) of the good ones. That is, the reported accuracy for the double sigmoid model is 86% when it should be much closer to the actual 97%, but with the automatically, more accurately determining is 96% which is within a percent of matching the true accuracy. The bad calls the more accurate determination failed to identify are typically the ambiguous ones which lie close to the boundary between the two classes. These ambiguous calls do not strongly influence the fit, though they may slightly hurt the accuracy score.

Consequently, it is more to accurate to determine any binary classifier's accuracy when training data includes inaccurate labels by fitting an error-tolerant model to the data and then flagging the points which are inconsistent with the model with high probability (say, ≥99.9%).

Figure 13:
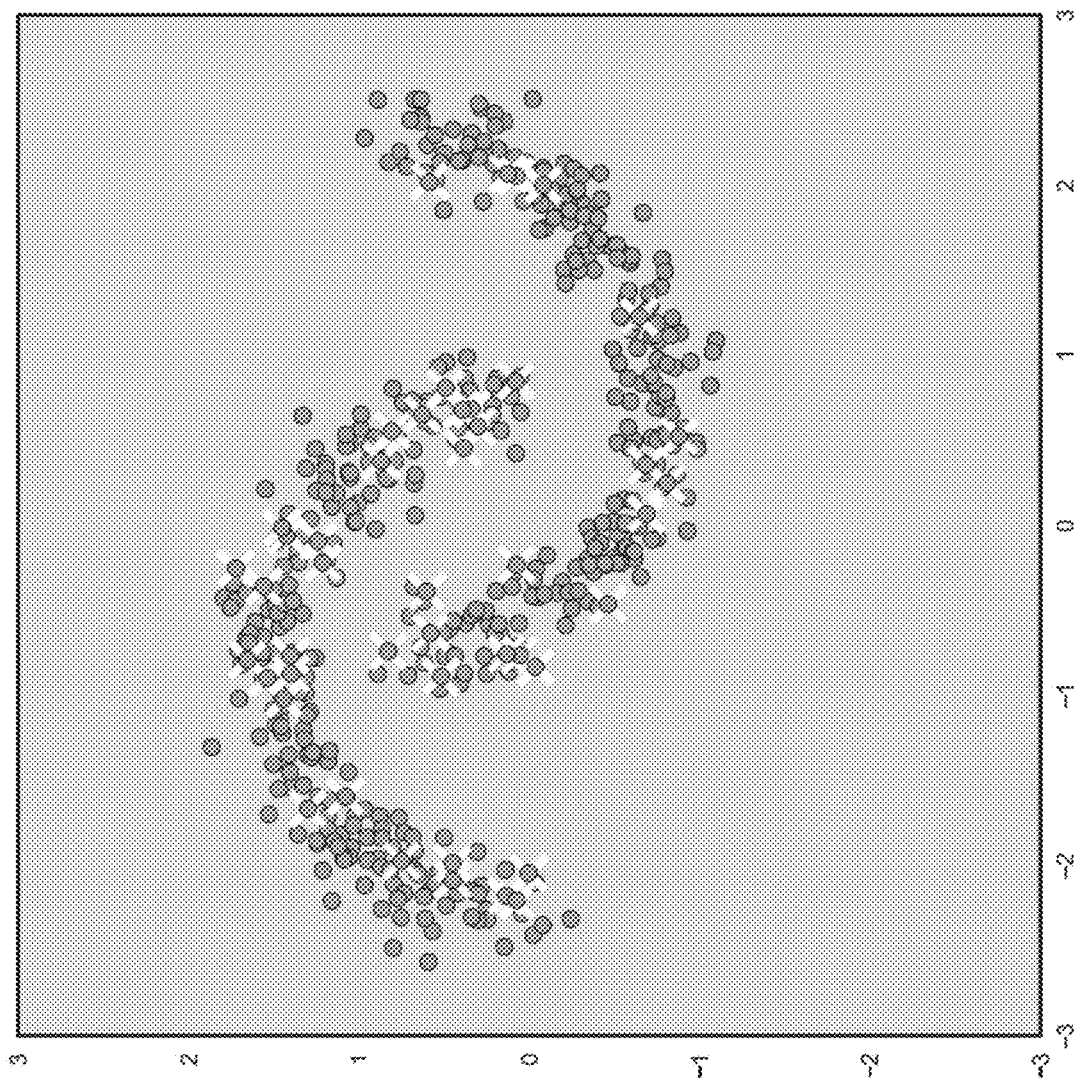
FIG. 13, shows training data having separates classes in a circular separation instead of a straight line.

The error-tolerant model which handles mislabeled ground truth points is based on logistic regression and thus predicated on the assumption that the classes are linearly separable—i.e. that we can draw a straight line which separates the classes as shown in FIGS. 11A-B and 12A-B. Thus, a different model can be used for a dataset 1300 as shown in FIG. 13, which separates classes in a circular separation instead of a straight line. For example, instead of the double sigmoid or error tolerant logistic regression model, to separate or classify the data 1300, an alternative double sigmoid or error tolerant model based on neural-networks can be used.

Figure 14:
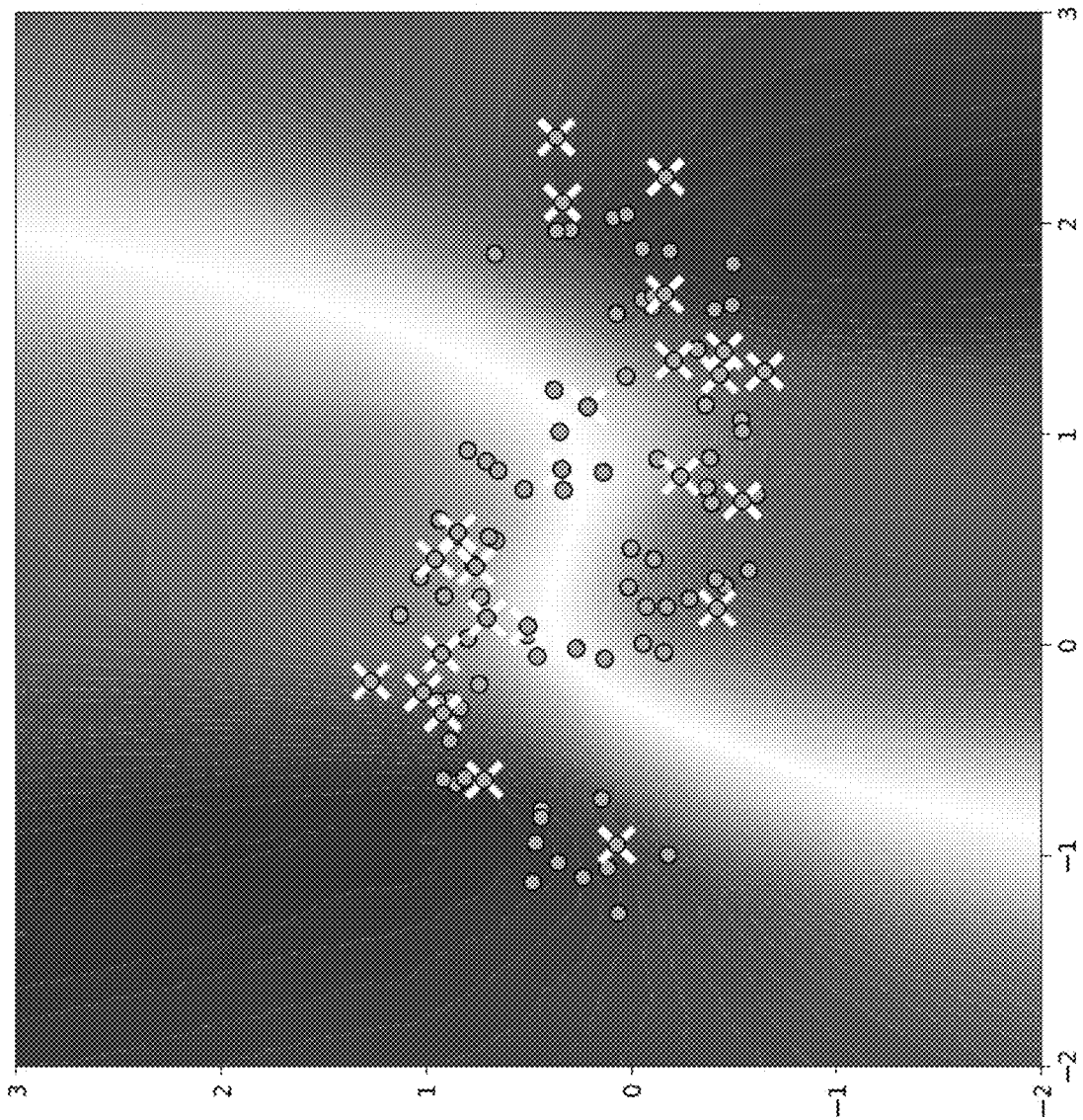
FIG. 14, shows an example plot of predicted outputs and a dividing line between true and false points for an error-tolerant neural network model trained on the data from FIG. 13.

For example, FIG. 14, shows an example plot 1400 of predicted outputs and a dividing line between true and false points for an error-tolerant neural network model trained on the data from FIG. 13. In some cases, the plot 1400 is an output of an error-tolerant neural network model trained on the data from FIG. 13 which includes data with mislabeled or incorrect known outputs for a neural network version of the regression model of any one or two of equations (7)-(13). The plot 1400 may be predicted outputs by the neural network model for data having separates classes in a circular separation.

Figure 15:
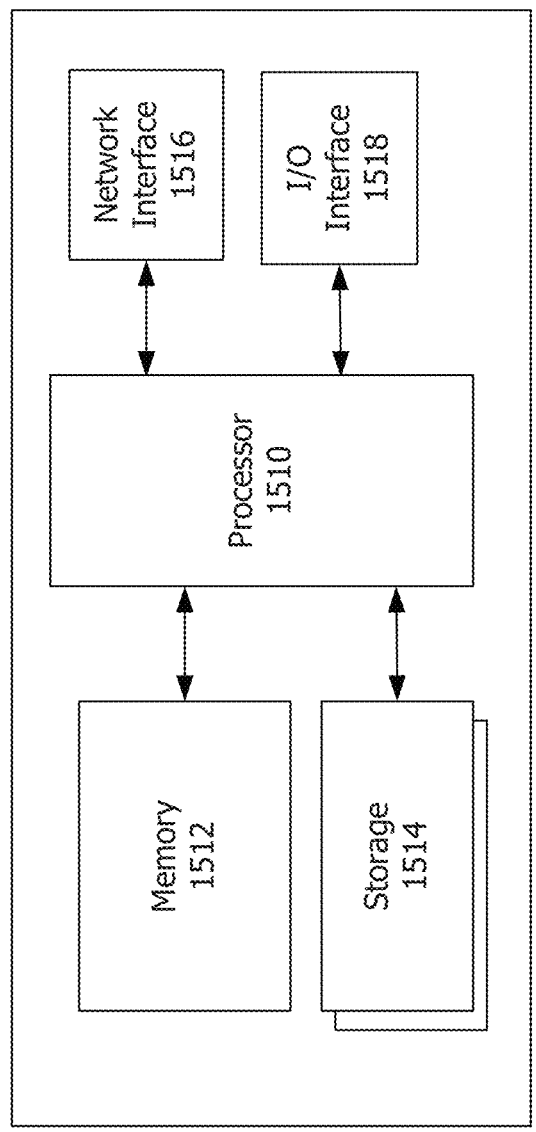
FIG. 15 is a block diagram of a tolerator for determining whether training data is incorrect for training a binary signal classifier, tolerating such incorrect data, removing such incorrect data, and determining an accuracy score for the classifier.

FIG. 15 is a block diagram of a tolerator 1500 configured to determine or for determining whether training data is incorrect for training a binary signal classifier, tolerating such incorrect data, removing such incorrect data, and determining an accuracy score for the classifier. It may be a desktop or laptop computer, a server computer, a tablet, a smartphone or other mobile device. The computing device 1500 may include software and/or hardware for providing functionality and features described herein. The computing device 1500 may therefore include one or more of: logic arrays, memories, analog circuits, digital circuits, software, firmware and processors. The hardware and firmware components of the computing device 1500 may include various specialized units, circuits, software and interfaces for providing the functionality and features described herein. For example, a global positioning system (GPS) receiver or similar hardware may provide location-based services.

The computing device 1500 has a processor 1510 coupled to a memory 1512, storage 1514, a network interface 1516 and an I/O interface 1518. The processor 1510 may be or include one or more microprocessors, field programmable gate arrays (FPGAs), application specific integrated circuits (ASICs), programmable logic devices (PLDs) and programmable logic arrays (PLAs).

The memory 1512 may be or include RAM, ROM, DRAM, SRAM and MRAM, and may include firmware, such as static data or fixed instructions, BIOS, system functions, configuration data, and other routines used during the operation of the computing device 1500 and processor 1510. The memory 1512 also provides a storage area for data and instructions associated with applications and data handled by the processor 1510. As used herein the term "memory" corresponds to the memory 1512 and explicitly excludes transitory media such as signals or waveforms.

The storage 1514 provides non-volatile, bulk or long-term storage of data or instructions in the computing device 1500. The storage 1514 may take the form of a magnetic or solid state disk, tape, CD, DVD, or other reasonably high capacity addressable or serial storage medium. Multiple storage devices may be provided or available to the computing device 1500. Some of these storage devices may be external to the computing device 1500, such as network storage or cloud-based storage. As used herein, the terms "storage" and "storage medium" correspond to the storage 1514 and explicitly exclude transitory media such as signals or waveforms. In some cases, such as those involving solid state memory devices, the memory 1512 and storage 1514 may be a single device.

The network interface 1516 includes an interface to a network such as a network that can be used to communicate calls, signals, training data, predicted outputs, tolerator data and binary classifier data described herein. The network interface 1516 may be wired or wireless.

The I/O interface 1518 interfaces the processor 1510 to peripherals (not shown) such as displays, video and still cameras, microphones, keyboards and USB devices.

In some cases, storage 1514 is a non-volatile machine-readable storage medium that includes all types of computer readable media, including magnetic storage media, optical storage media, and solid state storage media. It should be understood that the software can be installed in and sold with the device 1500. Alternatively, the software can be obtained and loaded into the device 1500, including obtaining the software via a disc medium or from any manner of network or distribution system, including from a server owned by the software creator or from a server not owned but used by the software creator. The software can be stored on a server for distribution over the Internet.

Some technologies described for the tolerator or computing device 1500 may include numerous units including a logistic regression model trained with a set of training data entries, each training data entry having known inputs and a known output label, wherein the set of training data entries includes a subset of training data entries that have incorrectly labeled known output labels. The trained logistic regression model has parameters based on: a correct likelihood ratio that each training data entry of the set of training data entries has a correctly labeled output label and an incorrect likelihood ratio that each training data entry of the set of training data entries has an incorrectly labeled output label; a correct priori odds ratio that the set of training data entries have correctly labeled output labels and an incorrect priori odds ratio that the set of training data entries have incorrectly labeled output labels; a correct probability that each entry of the set of entries has a correctly labeled output label that includes the correct likelihood ratio for that entry and the correct prior odds ratio; an incorrect probability that each entry of the set of entries has an incorrectly labeled output label that includes the incorrect likelihood ratio for that entry and the incorrect prior odds ratio; and a combination of the correct probability and the incorrect probability. In some case, the correct likelihood ratio is a first logistic regression model fit to each entry of the training data to minimize a likelihood function that each entry of the training data fits the first logistic regression model; and the incorrect likelihood ratio is a second logistic regression model fit to each entry of the training data to minimize a likelihood function that each entry of the training data fits the second logistic regression model. Also, for some cases, the correct probability for each entry is a multiplication or an addition of the correct likelihood ratio and the correct prior odds ratio, the incorrect probability for each entry is a multiplication or an addition of the incorrect likelihood ratio and the incorrect prior odds ratio; and the combination is an addition of the correct probability and the incorrect probability.

The technologies described herein provide various technological improvements to computer performance and efficiently. For example, the tolerator 1500 and/or the processes herein are technological improvements over those of the past because they provide a much more accurate and efficient device and/or process for determining whether training data is incorrect for training a binary signal classifier, tolerating such incorrect data, removing such incorrect data, and determining an accuracy score for the classifier. For example, the models described for equations (7)-(13) may be or be used as an error tolerant model for training of machine learning binary classifiers with training data that includes incorrect binary output labels. These models may ignore or compensate for the incorrect labeled training data by including a probability that each training data has an incorrectly identified output label. This keeps the model from overcommitting to the incorrectly identified output labels which is what happens for a model that only considers a correctly identified output label. Also, the models described for equations (12)-(13) may be or be used as an approximated error tolerant model for training of machine learning binary classifiers with training data that includes incorrect binary output labels that can be used by a computer because they add, not multiply, certain terms (they are quadratic; not cubic) to avoid computer based numeric overflow and underflow. Next, the models described for equations (7)-(13) may be or be used as an error tolerant model for determining the accuracy of any trained machine learning binary classifier by cleaning a set of real training data having outputs that are fabricated by or confirmed by a human, but are generated by customers or a computer.

Within this description, the term "computing device" may mean a collection of hardware, which may be augmented by firmware and/or software, that performs the described functions. An engine may typically be designed using a hardware description language (HDL) that defines the engine primarily in functional terms. The HDL design may be verified using an HDL simulation tool. The verified HDL design may then be converted into a gate netlist or other physical description of the engine in a process commonly termed "synthesis". The synthesis may be performed automatically using a synthesis tool. The gate netlist or other physical description may be further converted into programming code for implementing the engine in a programmable device such as a field programmable gate array (FPGA), a programmable logic devices (PLD), or a programmable logic arrays (PLA). The gate netlist or other physical description may be converted into process instructions and masks for fabricating the engine within an application specific integrated circuit (ASIC).

Within this description, the term "unit" also means a collection of hardware, firmware, and/or software, which may be on a smaller scale than a "computing device". For example, a computing device may contain multiple units, some of which may perform similar functions in parallel. The terms "computing device" and "unit" do not imply any physical separation or demarcation. All or portions of one or more units and/or computing devices may be collocated on a common card, such as a network card, or within a common FPGA, ASIC, or other circuit device.

A computing device as used herein refers to any device with a processor, memory and a storage device that may execute instructions including, but not limited to, personal computers, server computers, computing tablets, set top boxes, video game systems, personal video recorders, telephones, personal digital assistants (PDAs), portable computers, and laptop computers. These computing devices may run an operating system, including variations of the Linux, Microsoft Windows, Symbian, and Apple Mac operating systems.

The techniques may be implemented with machine readable storage media in a storage device included with or otherwise coupled or attached to a computing device. That is, the software may be stored in electronic, machine readable media. These storage media include magnetic media such as hard disks, optical media such as compact disks (CD-ROM and CD-RW) and digital versatile disks (DVD and DVD±RW); flash memory cards; and other storage media. As used herein, a storage device is a device that allows for reading and/or writing to a storage medium. Storage devices include hard disk drives, DVD drives, flash memory devices, and others.

The tolerator may include a processor and/or a tolerator unit. These units may be hardware, software, firmware, or a combination thereof. Additional and fewer units, modules or other arrangement of software, hardware and data structures may be used to achieve the processes and apparatuses described herein.

CLOSING COMMENTS

Throughout this description, the technologies described and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one technology are not intended to be excluded from a similar role in other technologies.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method of automatically tolerating training data that is incorrect when training a machine learning binary classifier, the method comprising:
    training the machine learning binary classifier using a set of training data entries, each training data entry having known inputs and a known output label, wherein the set of training data entries includes a subset of training data entries that have incorrectly labeled known output labels for both a binary true state and a binary false state of the output labels;
    wherein training comprises:
    determining a correct likelihood ratio that each training data entry of the set of training data entries has a correctly labeled output label and an incorrect likelihood ratio that each training data entry of the set of training data entries has an incorrectly labeled output label;
    identifying a correct a priori odds ratio that the set of training data entries have correctly labeled output labels and an incorrect a priori odds ratio that the set of training data entries have incorrectly labeled output labels;
    calculating a correct probability that each entry of the set of entries has a correctly labeled output label using the correct likelihood ratio for that entry and the correct a priori odds ratio;
    calculating an incorrect probability that each entry of the set of entries has an incorrectly labeled output label using the incorrect likelihood ratio for that entry and the incorrect a priori odds ratio; and
    training the machine learning binary classifier using a tolerant logistic regression model that combines the correct probability and the incorrect probability, wherein training the machine learning binary classifier using a logistic regression model includes adding the correct probability and the incorrect probability.

2. The method of claim 1, wherein:
    the tolerant logistic regression model includes a first and second logistic regression model;
    determining the correct likelihood ratio comprises fitting the first logistic regression model to each entry of the training data and determining the incorrect likelihood ratio comprises fitting the second logistic regression model to each entry of the training data; and
    wherein fitting comprises minimizing a likelihood function that each entry of the training data fits a logistic regression model to estimate model parameters of a logistic regression model.

3. The method of claim 2, wherein:
    calculating the correct probability for each entry includes multiplying the correct likelihood ratio and the correct a priori odds ratio, and
    calculating the incorrect probability for each entry includes multiplying the incorrect likelihood ratio and the incorrect a priori odds ratio.

4. The method of claim 3, wherein training the machine learning binary classifier using a logistic regression model includes adding the correct probability and the incorrect probability.

5. The method of claim 1, wherein the machine learning binary classifier includes one of a logistic regression model, a neural network, a perceptron model, a multi-layer perceptron model, a naive Bayes/Bayes model, a decision tree model, a random forest model or a deep neural network model.

6. The method of claim 1, wherein identifying the correct a priori odds ratio and the incorrect a priori odds ratio comprises one of a machine detecting or a person observing a percentage of a different set of data entries that have correctly labeled predicted output labels after being estimated by a trained version of the machine learning binary classifier.

7. The method of claim 1, further comprising:
    creating the set of training data entries by using one of a machine detecting or a person observing the known output labels of the set of training data entries based on observing the known inputs of the set of training data entries.

8. The method of claim 2, wherein:
    calculating the correct probability for each entry includes adding the correct likelihood ratio and the correct a priori odds ratio, and
    calculating the incorrect probability for each entry includes adding the incorrect likelihood ratio and the incorrect a priori odds ratio.

9. The method of claim 1, wherein the correct likelihood ratio is a first sigmoid term for a label li being correct, and the incorrect likelihood ratio is a second sigmoid term for the label li being incorrect that is nearly a mirror image of the first sigmoid term.

10. The method of claim 2, further comprising:
    plotting the correct likelihood ratio and incorrect likelihood ratio versus a logit of the known inputs for the set of training entries using the binary classifier trained with the set of training entries; and
    determining an approximated correct likelihood ratio and an approximated incorrect likelihood ratio by performing an estimation of the plots.

11. A system for automatically tolerating training data that is incorrect using a machine learning binary classifier, the system comprising:
    a tolerant logistic regression model trained with a set of training data entries, each training data entry having known inputs and a known output label, wherein the set of training data entries includes a subset of training data entries that have incorrectly labeled known output labels;

the trained logistic regression model having parameters based on:

a correct likelihood ratio that each training data entry of the set of training data entries has a correctly labeled output label and an incorrect likelihood ratio that each training data entry of the set of training data entries has an incorrectly labeled output label for both a binary true state and a binary false state of the output labels;

a correct a priori odds ratio that the set of training data entries have correctly labeled output labels and an incorrect a priori odds ratio that the set of training data entries have incorrectly labeled output labels;

a correct probability that each entry of the set of entries has a correctly labeled output label that includes the correct likelihood ratio for that entry and the correct a priori odds ratio;

an incorrect probability that each entry of the set of entries has an incorrectly labeled output label that includes the incorrect likelihood ratio for that entry and the incorrect a priori odds ratio; and a combination of the correct probability and the incorrect probability, wherein the combination of the correct probability and the incorrect probability is an addition of the correct probability and the incorrect probability.

12. The system of claim 11, wherein:

the tolerant logistic regression model includes a first and second logistic regression model;

the correct likelihood ratio is the first logistic regression model fit to each entry of the training data to minimize a likelihood function that each entry of the training data fits the first logistic regression model; and the incorrect likelihood ratio is the second logistic regression model fit to each entry of the training data to minimize a likelihood function that each entry of the training data fits the second logistic regression model.

13. The system of claim 12, wherein:

the correct probability for each entry is a multiplication or an addition of the correct likelihood ratio and the correct a priori odds ratio; and the incorrect probability for each entry is a multiplication or an addition of the incorrect likelihood ratio and the incorrect a priori odds ratio.

14. A non-transitory machine computer-readable medium storing one or more sequences of instructions which when executed by one or more processors will cause the one or more processors to automatically carry out the steps of:

training a machine learning binary classifier using a set of training data entries, each training data entry having known inputs and a known output label, wherein the set of training data entries includes a subset of training data entries that have incorrectly labeled known output labels for both a binary true state and a binary false state of the output labels;

wherein training comprises:

determining a correct likelihood ratio that each training data entry of the set of training data entries has a correctly labeled output label and an incorrect likelihood ratio that each training data entry of the set of training data entries has an incorrectly labeled output label;

identifying a correct a priori odds ratio that the set of training data entries have correctly labeled output labels and an incorrect a priori odds ratio that the set of training data entries have incorrectly labeled output labels;

calculating a correct probability that each entry of the set of entries has a correctly labeled output label using the correct likelihood ratio for that entry and the correct a priori odds ratio;

calculating an incorrect probability that each entry of the set of entries has an incorrectly labeled output label using the incorrect likelihood ratio for that entry and the incorrect a priori odds ratio; and training the machine learning binary classifier using a tolerant logistic regression model that combines the correct probability and the incorrect probability, wherein training the machine learning binary classifier using a logistic regression model includes adding the correct probability and the incorrect probability.

15. The non-transitory computer-readable medium of claim 14, wherein:

the tolerant logistic regression model includes a first and second logistic regression model;

determining the correct likelihood ratio comprises fitting the first logistic regression model to each entry of the training data and determining the incorrect likelihood ratio comprises fitting the second logistic regression model to each entry of the training data; and wherein fitting comprises minimizing a likelihood function that each entry of the training data fits a logistic regression model to estimate model parameters of a logistic regression model.

16. The non-transitory computer-readable medium of claim 14, wherein:

calculating the correct probability for each entry is one of a multiplication or an addition of the correct likelihood ratio and the correct a priori odds ratio; and calculating the incorrect probability for each entry is one of a multiplication or an addition of the incorrect likelihood ratio and the incorrect a priori odds ratio.

* * * * *